(12) United States Patent
Shin et al.

(10) Patent No.: US 11,693,583 B2
(45) Date of Patent: Jul. 4, 2023

(54) MEMORY CONTROLLER AND OPERATING METHOD THEREOF

(71) Applicant: SK hynix Inc., Gyeonggi-do (KR)

(72) Inventors: Dong Sun Shin, Gyeonggi-do (KR); Ho Ryong You, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/088,821

(22) Filed: Nov. 4, 2020

(65) Prior Publication Data

US 2021/0365202 A1    Nov. 25, 2021

(30) Foreign Application Priority Data

May 19, 2020    (KR) .......................... 10-2020-0059819

(51) Int. Cl.
*G06F 3/06*    (2006.01)

(52) U.S. Cl.
CPC .......... *G06F 3/0655* (2013.01); *G06F 3/0604* (2013.01); *G06F 3/0652* (2013.01); *G06F 3/0676* (2013.01); *G06F 3/0679* (2013.01)

(58) Field of Classification Search
CPC .... G06F 3/0679; G06F 3/0652; G06F 3/0604; G06F 3/0655; G06F 3/0676; G06F 3/064; G06F 3/061; G06F 3/0616; G06F 3/0656; G06F 3/0688
USPC ................................................ 711/154, 103
See application file for complete search history.

(56) References Cited

U.S. PATENT DOCUMENTS

| | | | |
|---|---|---|---|
| 10,915,394 B1* | 2/2021 | Shappir | G06F 11/1451 |
| 2005/0207229 A1* | 9/2005 | Takeuchi | G11C 8/08 |
| | | | 365/185.25 |
| 2013/0080730 A1* | 3/2013 | Kim | G06F 12/0246 |
| | | | 711/E12.008 |
| 2019/0095116 A1* | 3/2019 | Igahara | G06F 3/0634 |
| 2019/0258569 A1* | 8/2019 | McVay | G06F 3/0608 |
| 2020/0081828 A1* | 3/2020 | Chen | G06F 3/0679 |
| 2021/0035627 A1* | 2/2021 | Tanpairoj | G11C 11/4082 |

FOREIGN PATENT DOCUMENTS

| | | |
|---|---|---|
| KR | 10-2014-0096875 | 8/2014 |
| KR | 10-2016-0096435 | 8/2016 |

* cited by examiner

*Primary Examiner* — Hashem Farrokh
(74) *Attorney, Agent, or Firm* — IP & T Group LLP

(57) ABSTRACT

A memory controller controls a memory device including a plurality of memory blocks. The memory controller is configured to: control the memory device to store data in a first area among areas of the memory device using a single level cell method, wherein the data are corresponded to a write booster request which is received from a host, perform a wear leveling operation, based on a size of the data stored in the first area, a program-erase count of each of memory blocks of the first area, and a number of free blocks in the memory device and form a mapping relationship between a logical block address, which is received from the host, and a physical block address corresponding the first area.

16 Claims, 18 Drawing Sheets

WB_COUNT = '10'

FIG. 10

| BLK | EW_COUNT |
|---|---|
| BLK1 (MAX) | 1500 |
| BLK2 | 600 |
| BLK3 | 100 |
| BLK4 | 1000 |

AVE : 800
MAX-AVE : 700

FIG. 11

| BLK1 | BLK2 | BLK3 | BLK4 | BLK5 | BLK6 | BLK7 | BLK8 |
|---|---|---|---|---|---|---|---|
| BLK9 | BLK10 | BLK11 | BLK12 | BLK13 | BLK14 | BLK5 | BLK16 |
| BLK17 | BLK18 | BLK19 | BLK20 | BLK21 | BLK22 | BLK23 | BLK24 |
| BLK25 | BLK26 | BLK27 | BLK28 | BLK29 | BLK30 | BLK31 | BLK32 |
| BLK33 | BLK34 | BLK35 | BLK36 | BLK37 | BLK38 | BLK39 | BLK40 |
| BLK41 | BLK42 | BLK43 | BLK44 | BLK45 | BLK46 | BLK47 | BLK48 |

Rows 1–5: Open Block
Row 6: Reserved Block

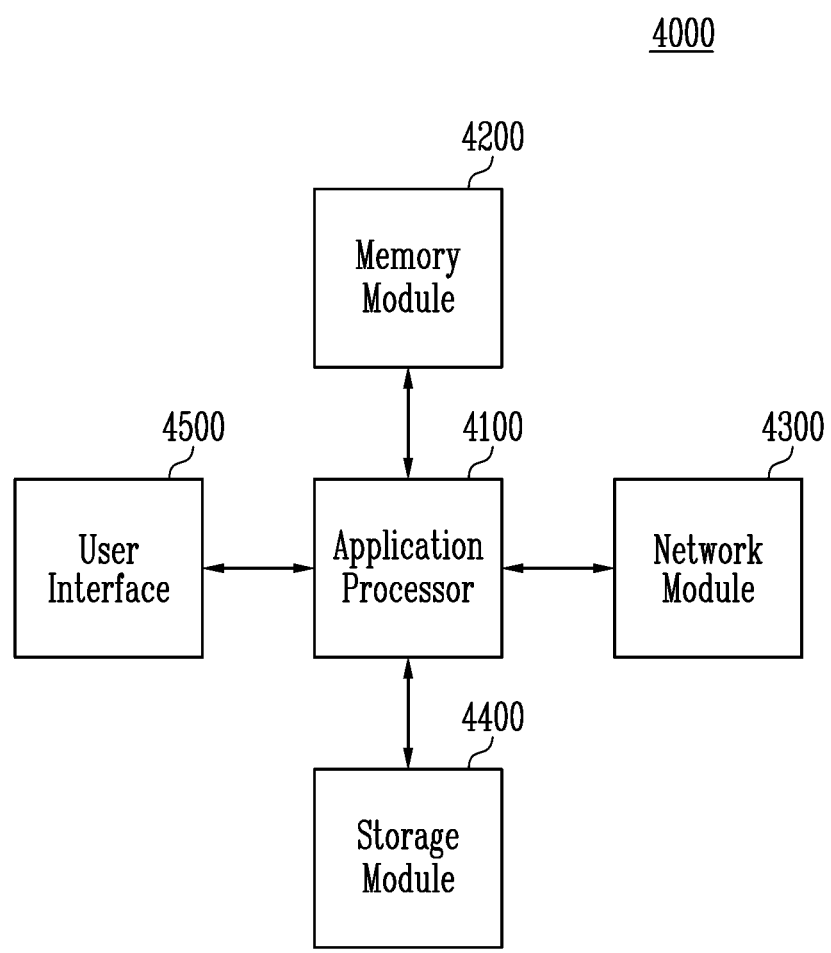

MEMORY CONTROLLER AND OPERATING METHOD THEREOF

CROSS-REFERENCE TO RELATED APPLICATION

The present application claims priority under 35 U.S.C. § 119(a) to Korean patent application number 10-2020-0059819, filed on May 19, 2020, which is incorporated herein by reference in its entirety.

BACKGROUND

Field of Invention

The present disclosure generally relates to an electronic device, and more particularly, to a memory controller and an operating method thereof.

Description of Related Art

A storage device is configured to store data under the control of a host device such as a computer, a smart phone or a smart pad. The storage device may be configured to store data on a magnetic disk, such as a Hard Disk Drive (HDD), or configured to store data in a semiconductor memory, particularly, a nonvolatile memory, such as a Solid State Drive (SSD) or a memory card.

The storage device may include a memory device configured to store data and a memory controller configured to control the memory device. The memory device may be a volatile memory device or a nonvolatile memory device. Examples of nonvolatile memory devices include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), and a Ferroelectric RAM (FRAM).

SUMMARY

Embodiments provide a memory controller configured to perform a wear leveling operation for extending the life of a memory device, and an operating method of the memory controller.

In accordance with an aspect of the present disclosure, there is provided a memory controller for controlling a memory device including a plurality of memory blocks, the memory controller is configured to: control the memory device to store data in a first area among areas of the memory device using a single level cell method, wherein the data are corresponded to a write booster request which is received from a host, perform a wear leveling operation, based on a size of the data stored in the first area, a program-erase count of each of memory blocks of the first area, and a number of free blocks in the memory device and form a mapping relationship between a logical block address, which is received from the host, and a physical block address corresponding the first area.

In accordance with another aspect of the present disclosure, there is provided a method for operating a memory controller for controlling a memory device including a plurality of memory blocks, the method including: receiving a write booster request from a host, storing data corresponding to the write booster request in a first area using a single level cell method among areas of the memory device, storing a write booster count indicative of a size of the data corresponding to the write booster request output from the memory device whenever the size of the data stored in the first area is a first reference value or more and performing a wear leveling operation, based on the write booster count, a program-erase count of each of memory blocks of the first area, and a number of free blocks in the memory device.

In accordance with another aspect of the present disclosure, there is provided an operating method of a controller, the operating method including: controlling a memory device to program data into memory blocks, the programmed data including first data and second data and controlling the memory device to move the first data from a first memory block to a second memory block and to move the second data from a third memory block to the first memory block, among the memory blocks, when: an amount of the first data increases to more than a second threshold, the amount of the first data being detected whenever an amount of the programmed data becomes greater than a first threshold, difference between maximum and average values of program-erase counts of the memory blocks is greater than a third threshold, and a number of free blocks within the memory device is greater than a fourth threshold, wherein the first memory block has the maximum value.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 10 is a diagram illustrating a process in which the static wear leveling is performed based on a program-erase count.

FIG. 11 is a diagram illustrating a process in which the static wear leveling is performed based on a number of free blocks.

FIG. 18 is a block diagram illustrating a user system to which the storage device is applied in accordance with an embodiment of the present disclosure.

DETAILED DESCRIPTION

The specific structural and functional description disclosed herein is merely for the purpose of describing embodiments according to the concept of the present disclosure. The invention, however, can be implemented in various other forms and ways, and thus is not limited to the embodiments set forth herein. Throughout the specification, reference to "an embodiment," "another embodiment" or the like is not necessarily to only one embodiment, and different references to any such phrase are not necessarily to the same embodiment(s). The term "embodiments" when used herein does not necessarily to all embodiments.

Various embodiments of the present disclosure are described below in detail with reference to the accompanying drawings to enable those skilled in the art to practice and readily implement the invention.

Figure 1:
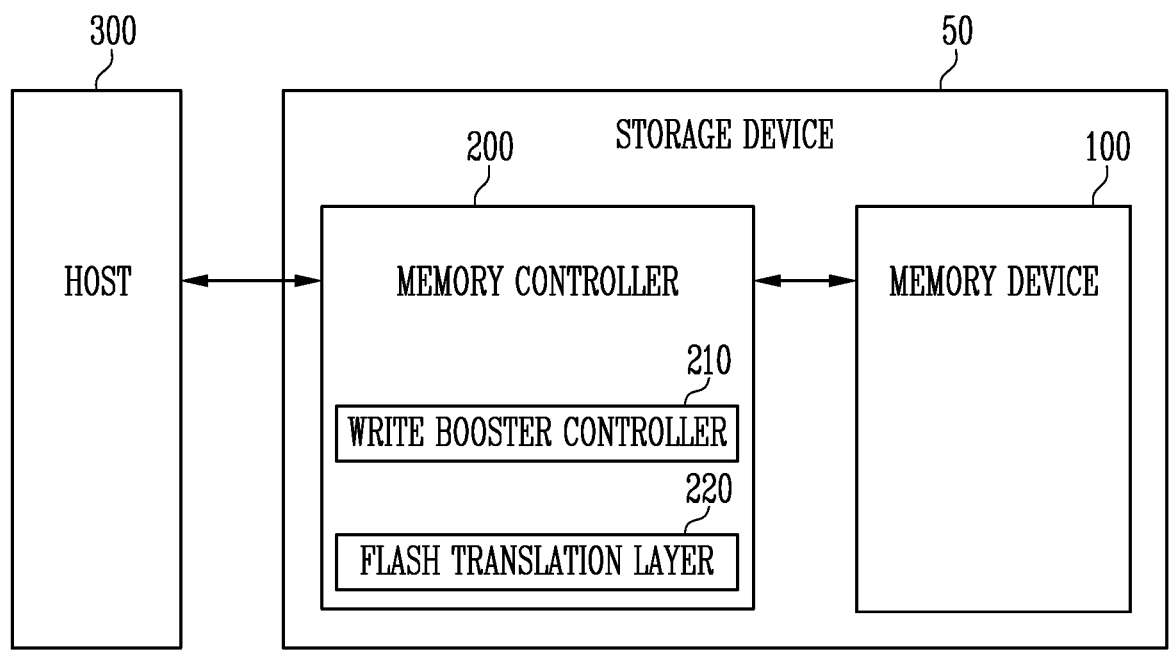
FIG. 1 is a block diagram illustrating a storage device.

FIG. 1 is a block diagram illustrating a storage device.

Referring to FIG. 1, the storage device 50 may include a memory device 100 and a memory controller 200.

The storage device 50 may store data under the control of a host 300, such as a mobile phone, a smart phone, an MP3 player, a laptop computer, a desktop computer, a game console, a TV, a tablet PC or an in-vehicle infotainment.

The storage device 50 may be configured as any of various types of storage devices according to a host interface that is a communication scheme with the host 300. For example, the storage device 50 may be implemented as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), and/or a memory stick.

The storage device 50 may be manufactured as any of various kinds of package types. For example, the storage device 50 may be manufactured as a Package-On-Package (POP), a System-In-Package (SIP), a System-On-Chip (SOC), a Multi-Chip Package (MCP), a Chip-On-Board (COB), a Wafer-level Fabricated Package (WFP), and/or a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of memory blocks. Each memory block may include a plurality of memory cells, and the plurality of memory cells may constitute a plurality of pages. In an embodiment, data may be stored in and read from the memory device 100 in a unit of a page. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, by way of example, the invention is described in the context in which the memory device 100 is a NAND flash memory.

In an embodiment, the memory device 100 may be implemented in a two-dimensional array structure or three-dimensional array structure. Hereinafter, although a case where the memory device 100 is implemented in the three-dimensional array structure is described as an embodiment, the present invention is not limited to the three-dimensional array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, the memory device 100 may be operated using a Single Level Cell (SLC) method in which one data bit is stored in one memory cell. Alternatively, the memory device 100 may be operated using a method in which at least two data bits are stored in one memory cell. For example, the memory device 100 may be operated using a Multi-Level Cell (MLC) method in which two data bits are stored in one memory cell, a Triple Level Cell (TLC) method in which three data bits are stored in one memory cell, or a Quadruple Level Cell (QLC) method in which four data bits are stored in one memory cell.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation according to the received command. For example, when a program command is received, the memory device 100 may program data in the area selected by the address. When a read command is received, the memory device 100 may read data from the area selected by the address. When an erase command is received, the memory device 100 may erase data stored in the area selected by the address.

In an embodiment, the memory controller 200 may include a write booster controller 210. The write booster controller 210 may temporarily store data received from the host 300 in an SLC buffer and then perform a static wear leveling (SWL) operation, based on a size of the data stored in the SLC buffer. The SLC buffer may be an area in which data are stored using the SLC method among areas of the memory device 100.

Specifically, the write booster controller 210 may receive a write booster request from the host 300. The write booster request may instruct the write booster controller 210 to temporarily store data received from the host 300 in the SLC buffer, and the write booster controller 210 may output a response representing that a program operation has been completed in response to the write booster request. That is, the write booster controller 210 outputs the response representing that the program operation has been completed even when the data received from the host 300 is not stored in a storage area, so that the host 300 may provide another request without waiting for the program operation to be completed, so that overall program operation speed can be increased.

In an embodiment, when the data temporarily stored in the SLC buffer has a certain size or more, the data stored in the SLC buffer may be flushed to the storage area of the memory device 100. When the data is flushed to the storage area of the memory device 100, the data stored in the SLC buffer may be erased in response to the write booster request.

In the present disclosure, when the write booster controller 210 receives, from the host 300, a write booster request and corresponding data, the write booster controller 210 may temporarily store the data in the SLC buffer and then output, to the host 300, a response representing that a program operation has been completed.

In an embodiment, when data having a certain size or more are stored in the SLC buffer, the write booster controller 210 may count the number of pieces of the data (or otherwise determine the size of) stored in response to the write booster request among data stored in the SLC buffer, and store information on the counted size in the memory controller 200 or the memory device 100. Whenever data has a size of a first reference value or more are stored in the SLC buffer, the write booster controller 210 may determine and store information on the size of the data stored in response to the write booster request. The first reference value may represent a portion of the maximum capacity of the SLC buffer (e.g., 80% of the maximum capacity of the SLC buffer).

In an embodiment, when the size of the data stored in response to the write booster request is increased by a second reference value or more from the previous stored size, or when the size of the data stored in response to the write booster request increases to be a second threshold value or more, the write booster controller 210 may determine a program-erase count of a memory block and a number of free blocks of the memory device 100. The program-erase count of a memory block may be increased by '1' whenever an erase operation is performed on the memory block. In addition, the number of free blocks of the memory device 100 may mean a number of erased memory blocks which can be allocated to the SLC buffer among reserved blocks in the memory device 100.

For example, the write booster controller 210 may determine and store information on a size of the data stored in response to the write booster request and then determine whether the determined and stored size has increased or decreased from the previously determined size. When the currently determined size of the data stored in response to the write booster request has increased by the second reference value or more from the previous determined size, or when the size of the data stored in response to the write booster request has increased to reach the second threshold value or more, the write booster controller 210 may determine a program-erase count and a number of free blocks.

First, the write booster controller 210 may determine a program-erase count of each of memory blocks in the SLC buffer. For example, the write booster controller 210 may determine whether a difference between a maximum value of the program-erase counts and an average value of the program-erase counts is a third reference value or more. That is, the write booster controller 210 may determine whether a program-erase count of a specific memory block is relatively greater than those of the other memory blocks in the SLC buffer. When the program-erase count of the specific memory block is greater than those of the other memory blocks in the SLC buffer, wear leveling may be performed such that the program-erase count is evenly increased for each memory block.

In an embodiment, when the difference between the maximum value of the program-erase counts and the average value of the program-erase counts is the third reference value or more, the write booster controller 210 may determine whether a number of free blocks in the memory device 100 is a fourth reference value or more. Since free blocks can be allocated to the SLC buffer, the write booster controller 210 may determine whether a number of free blocks which can be allocated to the SLC buffer is sufficient. When the number of free blocks is the fourth reference value or more, the write booster controller 210 may determine that a static wear leveling (SWL) operation is to be performed.

In an embodiment, by the static wear leveling (SWL) operation, write booster data stored in a first memory block having a maximum program-erase count within the SLC buffer may be moved to a second memory block within the SLC buffer, and normal data may be moved from the second memory block to the first memory block. Therefore, the write booster controller 210 may control the program-erase count of the first memory block having the maximum program-erase count to no longer increase, by allowing only normal data to be stored in the first memory block.

In an embodiment, the memory controller 200 may include a flash translation layer 220. The flash translation layer 220 may form a mapping relationship between a logical block address LBA and a physical block address PBA according to whether a request received from the host 300 is a write booster request or a normal write request.

For example, when the request received from the host 300 is the write booster request, the flash translation layer 220 may translate a logical block address LBA to a physical bock address PBA such that data received from the host 300 is temporarily stored in the SLC buffer. That is, the flash translation layer 220 may translate the logical block address LBA into the physical block address PBA representing a specific page of the SLC buffer.

However, when the request received from the host 300 is a normal write request, the flash translation layer 220 may translate the logical block address LBA into the physical block address PBA such that the corresponding data are stored in the SLC buffer or the storage area according to whether the request received from the host 300 is a request for programming data by using the SLC method or a request for programming data by using the TLC method.

Subsequently, when a size of the data stored in the SLC buffer is the first reference value or more, under the control of the write booster controller 210, the flash translation layer 220 may move write booster data stored in a memory block having a maximum program-erase count to another memory block, and form a mapping relationship such that normal data are stored in the memory block having the maximum program-erase count.

The memory controller 200 may control overall operation of the storage device 50.

When a power voltage is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may include firmware (not shown) which receives data and a logical block address LBA from the host 300, and translates the logical block address LBA into a physical block address PBA representing addresses of memory cells included in the memory device 100, in which data is to be stored. Also, the memory controller 200 may store, in a buffer memory (not shown), a logical-physical address mapping table that establishes a mapping relationship between the logical block address LBA and the physical block address PBA.

The memory controller 200 may control the memory device 100 to perform a program operation, a read operation, an erase operation, or the like in response to a request from the host 300. For example, when a program request is received from the host 300, the memory controller 200 may change the program request into a program command, and provide the memory device 100 with the program command, a physical block address PBA, and data. When a read request is received together with a logical block address LBA from the host 300, the memory controller 200 may change the read request into a read command, select a physical block address PBA corresponding to the logical block address LBA, and then provide the memory device 100 with the read command and the physical block address PBA. When an erase request is received together with a logical block address LBA from the host 300, the memory controller 200 may change the erase request into an erase command, select a physical block address PBA corresponding to the logical block address LBA, and then provide the memory device 100 with the erase command and the physical block address PBA.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the storage device 50 may further include the buffer memory (not shown). The memory controller 200 may control data exchange between the host 300 and the buffer memory. Alternatively, the memory controller 200 may temporarily store system data for controlling the memory device 100 in the buffer memory. For example, the memory controller 200 may temporarily store data input from the host 300 in the buffer memory, and then transmit the data temporarily stored in the buffer memory to the memory device 100.

In various embodiments, the buffer memory may be used as a working memory or cache memory of the memory controller 200. The buffer memory may store codes or commands executed by the memory controller 200. Alternatively, the buffer memory may store data processed by the memory controller 200.

In an embodiment, the buffer memory may be implemented with a Dynamic Random Access Memory (DRAM) such as a Double Data Rate Synchronous DRAM (DDR SDRAM), a DDR4 SDRAM, a Low Power Double Data Rate 4 (LPDDR4) SDRAM, a Graphics Double Data Rate (GDDR) SRAM, a Low Power DDR (LPDDR), or a Rambus Dynamic Random Access Memory (RDRAM), or a Static Random Access Memory (SRAM).

In various embodiments, the buffer memory may be a separate device coupled to the storage device 50. Therefore, one or more external volatile memory devices coupled to the storage device 50 may perform functions of the buffer memory.

In an embodiment, the memory controller 200 may control at least two memory devices. The memory controller 200 may control the memory devices according to an interleaving scheme so as to improve operational performance.

The host 300 may communicate with the storage device 50, using at least one of various communication protocols, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

Figure 2:
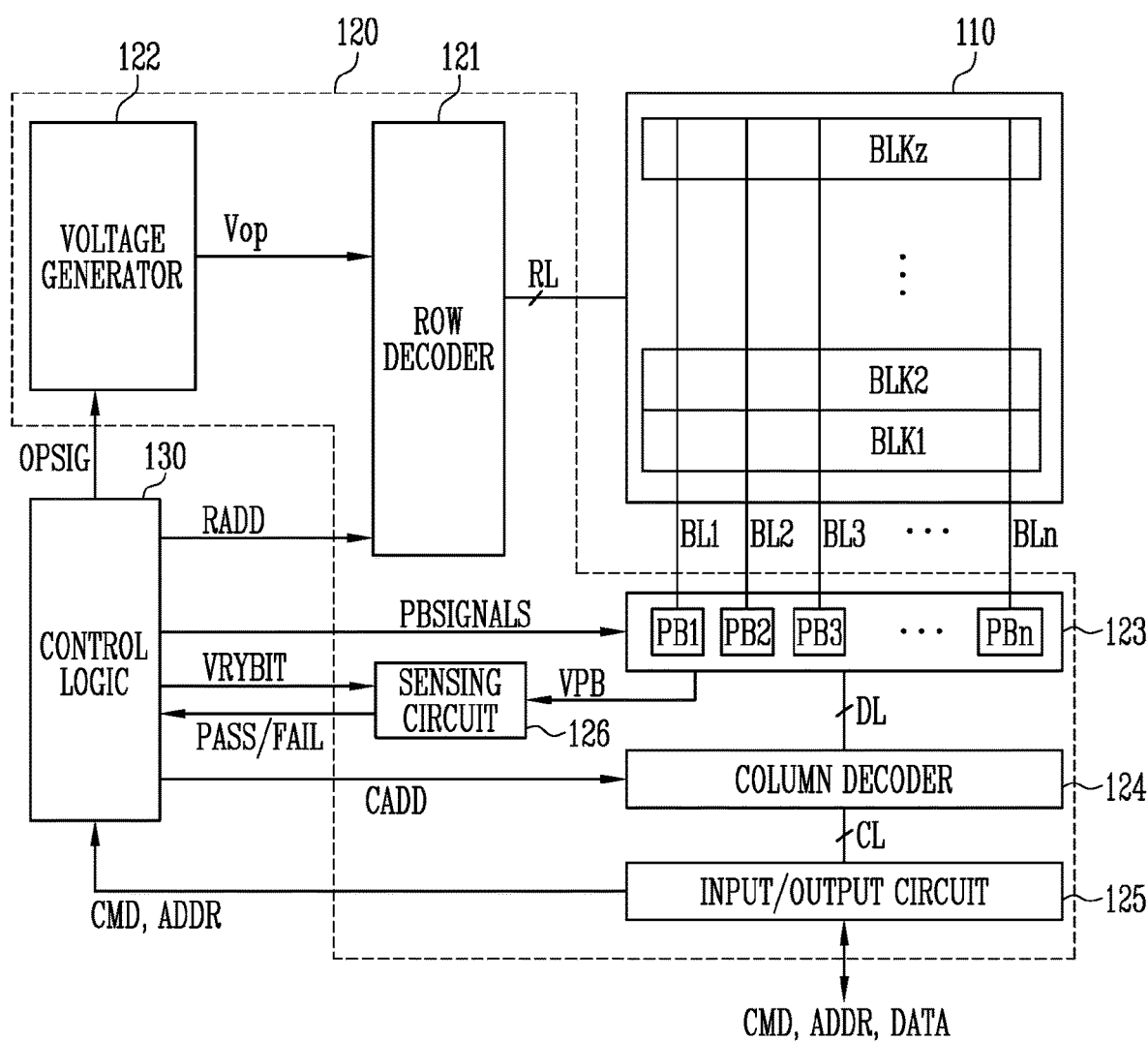
FIG. 2 is a diagram illustrating a structure of a memory device, such as that shown in FIG. 1.

FIG. 2 is a diagram illustrating a structure of the memory device shown in FIG. 1.

Referring to FIG. 2, the memory device 100 may include a memory cell array 100, a peripheral circuit 120, and control logic 130.

The memory cell array 110 includes a plurality of memory blocks BLK1 to BLKz, which are coupled to a row decoder 121 through row lines RL. The plurality of memory blocks BLK1 to BLKz are coupled to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells coupled to the same word line may be defined as one page. Therefore, one memory block may include a plurality of pages.

The row lines RL may include at least one source select line, a plurality of word lines, and at least one drain select line.

Each of the memory cells included in the memory cell array 110 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The peripheral circuit 120 may perform a program operation, a read operation or an erase operation on a selected region of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, the voltage generator 122, the page buffer group 123, a column decoder 124, an input/output circuit 125, and a sensing circuit 126.

The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 decodes row address RADD received from the control logic 130. The row decoder 121 selects at least one memory block among the memory blocks BLK1 to BLKz according to the decoded address. Also, the row decoder 121 may select at least one word line of the selected memory block to apply voltages generated by the voltage generator 122 to the at least one word line WL according to the decoded address.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage having a level higher than that of the verify voltage to the unselected word lines.

In a read operation, the row decoder 121 may apply a read voltage to the selected word line, and apply a read pass voltage having a level higher than that of the read voltage to the unselected word lines.

In an embodiment, an erase operation of the memory device 100 is performed in a memory block unit. In the erase operation, the row decoder 121 may select one memory block according to the decoded address. In the erase operation, the row decoder 121 may apply a ground voltage to word lines coupled to the selected memory blocks.

The voltage generator 122 operates under the control of the control logic 130. The voltage generator 122 generates a plurality of voltages by using an external power voltage supplied to the memory device 100. Specifically, the voltage generator may generate various operating voltages Vop used in program, read, and erase operations in response to an operation signal OPSIG. For example, the voltage generator 122 may generate a program voltage, a verify voltage, a pass voltage, a read voltage, an erased voltage, and the like under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage.

For example, the voltage generator 122 may include a plurality of pumping capacitors for receiving the internal power voltage, and generate the plurality of voltages by selectively activating the plurality of pumping capacitors under the control of the control logic 130.

The plurality of generated voltages may be supplied to the memory cell array 110 by the row decoder 121.

The page buffer group 123 includes first to nth page buffers PB1 to PBn, which are coupled to the memory cell array 110 respectively through first to nth bit lines BL1 to BLn. The first to nth bit lines BL1 to BLn operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense a voltage or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page are programmed according to the transferred data DATA. In a program verify operation, the first to nth page buffers PB1 to PBn read page data by sensing a voltage or current received from the selected memory cells through the first to nth bit lines BL1 to BLn.

In a read operation, the first to nth page buffers PB1 to PBn read data DATA from the memory cells of the selected page through the first to nth bit lines BL1 to BLn, and outputs the read data DATA to the input/output circuit 125 under the control of the column decoder 124.

In an erase operation, the first to nth page buffers PB1 to PBn may float the first to nth bit lines BL1 to BLn or apply an erase voltage.

The column decoder 124 may communicate data between the input/output circuit 125 and the page buffer group 123 in response to a column address CADD. For example, the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller (200 shown in FIG. 1), to the control logic 130, or exchange data DATA with the column decoder 124.

In a read operation or verify operation, the sensing circuit 125 may generate a reference current in response to an allow bit VRYBIT signal, and output a pass or fail signal PASS/FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR. For example, the control logic 130 may control a read operation of a selected memory block in response to a sub-block read command and an address. Also, the control logic 130 may control an erase operation on a selected sub-block included in the selected memory block in response to a sub-block erase command and an address. Also, the control logic 130 may determine whether the verify operation has passed or failed in response to the pass or fail signal PASS or FAIL.

Figure 3:
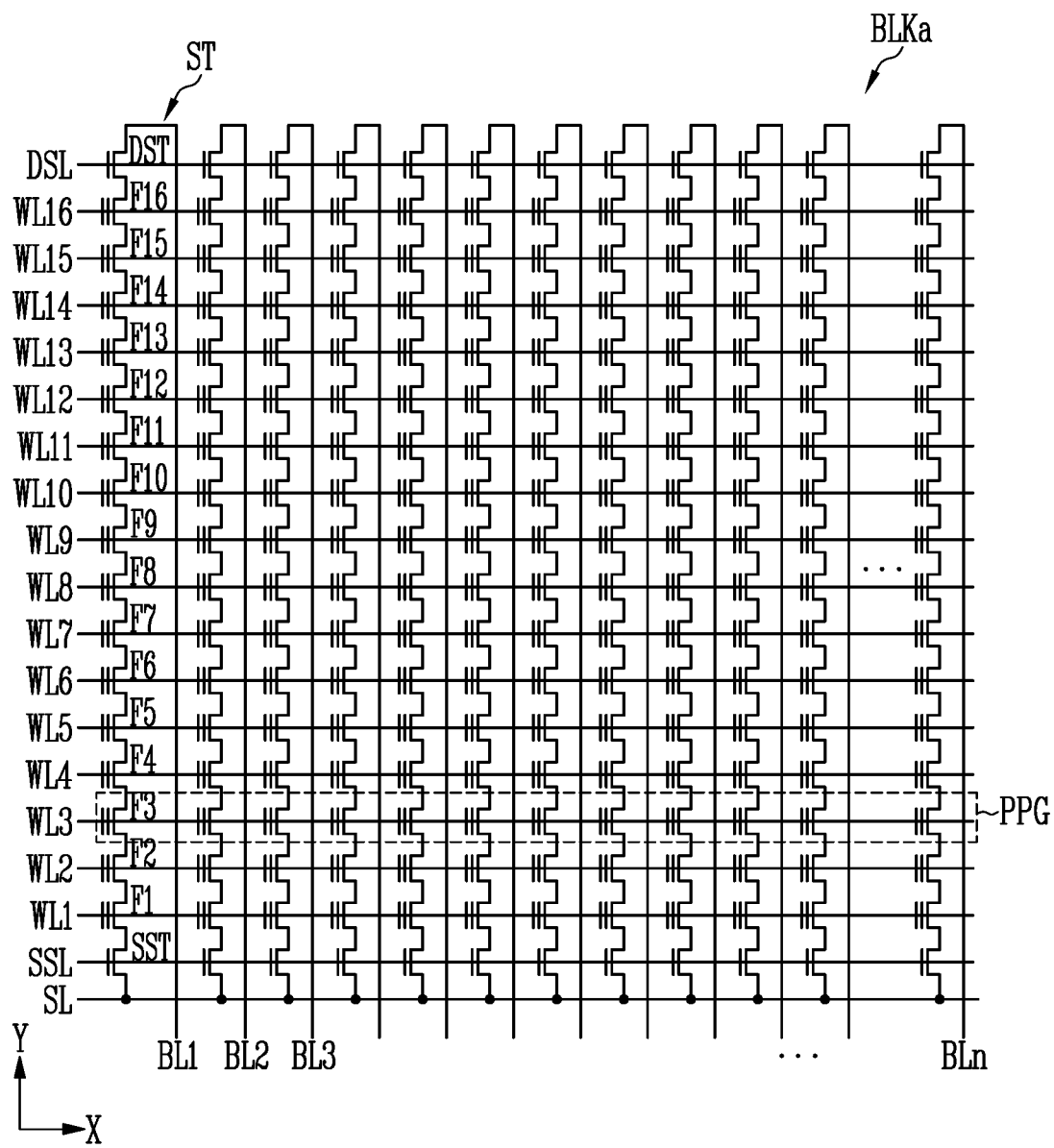
FIG. 3 is a diagram illustrating an embodiment of a memory cell array, such as that shown in FIG. 2.

FIG. 3 is a diagram illustrating an embodiment of the memory cell array shown in FIG. 2.

Referring to FIGS. 2 and 3, FIG. 3 is a circuit diagram illustrating any one memory block BLKa among the plurality of memory blocks BLK1 to BLKz included in the memory cell array 110 shown in FIG. 2.

In the memory block BLKa, a first select line, word lines, and a second select line, which are arranged in parallel, may be coupled to each other. For example, the word lines may be arranged in parallel between the first and second select lines. The first select line may be a source select line SSL, and the second select line may be a drain select line DSL.

More specifically, the memory block BLKa may include a plurality of strings coupled between bit lines BL1 to BLn and a source line SL. The bit lines BL1 to BLn may be respectively coupled to the strings, and the source line SL may be commonly coupled to the strings. Each of the strings may be configured the same; therefore, a string ST coupled to a first bit line BL1 is described in detail as an example.

The string ST may include a source select transistor SST, a plurality of memory cells F1 to F16, and a drain select transistor DAT, which are coupled in series to each other between the source line SL and the first bit line BL1. At least one source select transistor SST and at least one drain select transistor DST may be included in one string ST, and more than the 16 memory cells F1 to F16 shown in the drawing may be included in one string ST.

A source of the source select transistor SST may be coupled to the source line SL, and a drain of the drain select transistor DAT may be coupled to the first bit line BL1. The memory cells F1 to F16 may be coupled in series between the source select transistor SST and the drain select transistor DST. Gates of source select transistors SST included in different strings may be coupled to the source select line SSL, and gates of drain select transistors DST included in different strings may be coupled to the drain select line DSL. Gates of the memory cells F1 to F116 may be coupled to a plurality of word lines WL1 to WL16. A group of memory cells coupled to the same word line among memory cells included in different strings may be referred to as a physical page PPG. Therefore, physical pages corresponding to the number of the word lines WL1 to WL16 may be included in the memory block BLKa.

One memory cell may store data of one bit. The memory cell is generally referred to as a single level cell (SLC). One physical page PPG may store one logical page (LPG) data. The one LPG data may include data bits of which number corresponds to that of cells included in one physical page PPG. Alternately, one memory cell MC may store data of two or more bits. The memory cell is generally referred to as a multi-level cell (MLC). One physical page PPG may store two or more LPG data.

While an MLC generally means a cell that stores two or more bits, as memory cell capacity has increased, MLC is used more specifically to refer to a memory cell for storing data of two bits. A memory cell for storing data of three or more bits is referred to as a triple level cell (TLC), and a memory cell for storing data of four or more bits is referred to as a quadruple level cell (QLC).

In another embodiment, each of the plurality of memory blocks may have a three-dimensional structure. Each memory block may include a plurality of memory cells stacked on a substrate. The plurality of memory cells may be arranged along +X, +Y, and +Z directions.

Figure 4:
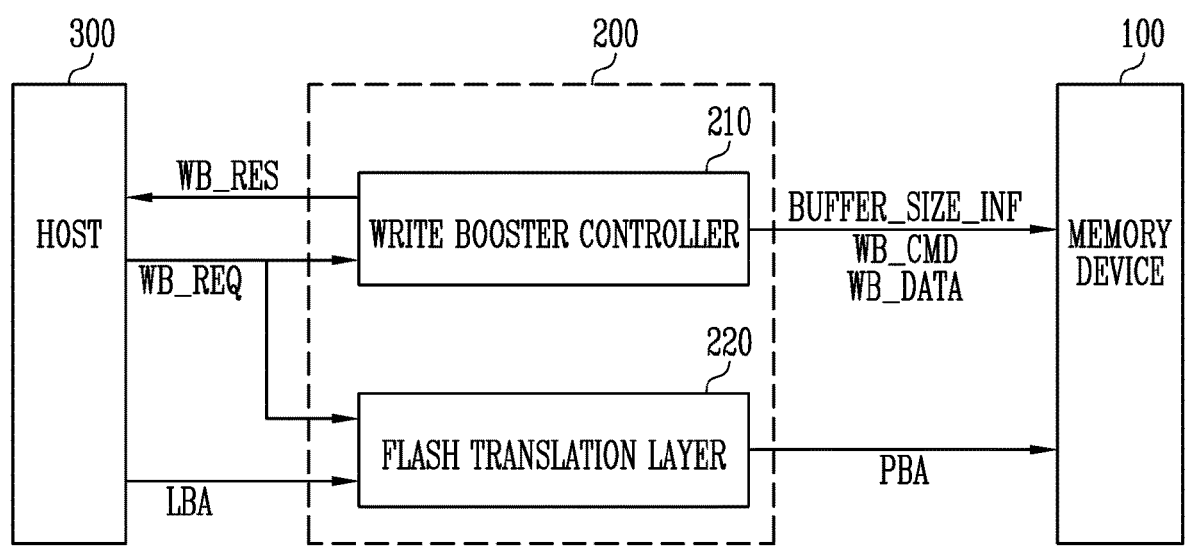
FIG. 4 is a diagram illustrating an operation among a host, a memory controller, and the memory device in a write booster operation.

FIG. 4 is a diagram illustrating an operation among the host, the memory controller, and the memory device in a write booster operation.

Referring to FIG. 4, the memory controller 200 shown in FIG. 4 may include a write booster controller 210 and a flash translation layer 220.

In an embodiment, the write booster controller 210 may receive a write booster request WB_REQ from the host 300. The write booster request WB_REQ may instruct the write booster controller 210 to output a response representing that a program has been completed, when data corresponding to the write booster request WB_REQ are all stored in the SLC buffer in the memory device 100 even before the data corresponding to the write booster request WB_REQ are all programmed in the storage area in the memory device 100. That is, the write booster request WB_REQ may instruct the write booster controller 210 to output a response representing that a program has been completed when write booster data WB_DATA corresponding to the write booster request WB_REQ are all stored in the SLC buffer.

In an embodiment, when the write booster controller 210 receives the write booster request WB_REQ from the host 300, the write booster controller 210 may first output, to the memory device 100, buffer size information BUFFER_SIZE_INF for setting a size of the SLC buffer in the memory device 100. The SLC buffer may be an area in which data are stored using the SLC method among storage areas included in the memory device 100. In addition to the write booster data WB_DATA corresponding to the write booster request WB_REQ, data corresponding to a normal write request instructing storage of data by using the SLC method may also be stored in the SLC buffer.

In an embodiment, when the write booster controller 210 outputs the buffer size information BUFFER_SIZE_INF, the memory device 100 may allocate some of free blocks in the memory device 100 as the SLC buffer, based on the buffer size information BUFFER_SIZE_INF. In addition, the size of the SLC buffer may be variously set, based on the buffer size information BUFFER_SIZE_INF output whenever the write booster controller 210 receives the write booster request WB_REQ from the host 300.

In an embodiment, the write booster controller 210 may output a write booster command WB_CMD and the write booster data WB_DATA to the memory device 100 in response to the write booster request WB_REQ of the host 300. The write booster data WB_DATA may be data to be programmed in the memory device 100 by a write boosting operation corresponding to the write booster command WB_CMD.

Therefore, in the write boosting operation corresponding to the write booster command WB_CMD, when the write booster data WB_DATA are all stored in the SLC buffer, the write booster operation may be completed even before the write booster data WB_DATA are all programmed in the storage area.

Subsequently, when the write booster data WB_DATA are all stored in the SLC buffer, the write booster controller 210 may output, to the host 300, a write booster response WB_RES representing that the write booster operation has been completed.

In an embodiment, the flash translation layer 220 may receive a write booster request WB_REQ and a logical block address LBA from the host 300. When the flash translation layer 220 receives the write booster request WB_REQ from the host 300, the flash translation layer 220 may translate the logical block address LBA received from the host 200 into a physical block address PBA representing a specific area of the SLC buffer. That is, the flash translation layer 220 may form a mapping relationship between the logical block address LBA and the physical address block PBA such that the write booster data WB_DATA received from the host 300 are stored in the specific area of the SLC buffer.

Subsequently, in the present disclosure, when the size of data stored in the SLC buffer is a certain size or more, a static wear leveling (SWL) operation may be performed based on an increase of the write booster data WB_DATA, the program-erase count for each memory block, and the number of free blocks in the memory device 100.

The memory device 100 may move normal data to a memory block having a maximum program-erase count such that the program-erase count is evenly increased for each memory block within the SLC buffer. That is, the flash translation layer 220 may prevent an increase in program-erase count of a SLC memory block having a relatively large program-erase count, and form a mapping relationship between the logical block address PBA and the physical block address PBA such that data are stored in a memory block having a relatively small program-erase count.

Figure 5:
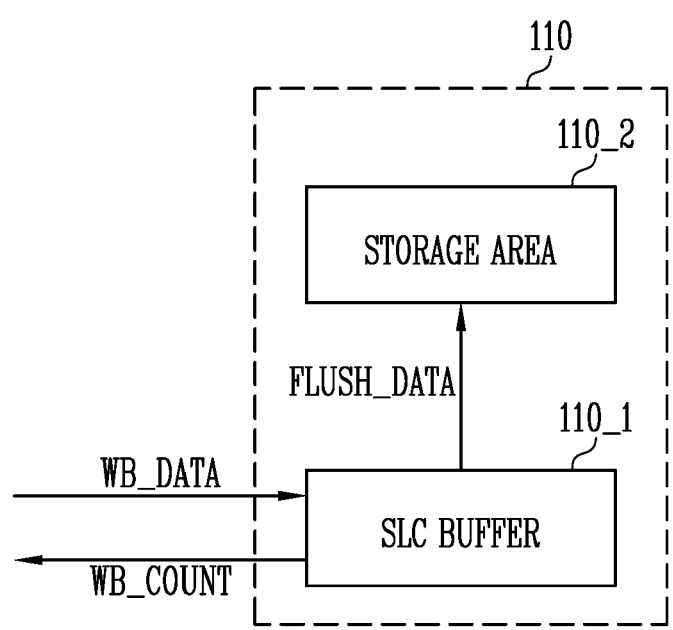
FIG. 5 is a diagram illustrating a method in which data are stored by the write booster operation.

FIG. 5 is a diagram illustrating a method in which data are stored by the write booster operation.

Referring to FIGS. 2 and 5, FIG. 5 illustrates a configuration of the memory cell array (110 shown in FIG. 2), and data programmed in the memory cell array 110 and a write booster count WB_COUNT output from the memory cell array 110 in the write booster operation. In FIG. 5, the memory cell array 110 may be divided into the SLC buffer 110_1 and the storage area 110_2. The SLC buffer 110_1 may be an area in which data are stored using the SLC method, and the storage area 110_2 may be an area in which data are stored using the TLC method.

In an embodiment, when memory device (100 shown in FIG. 4) receives a write booster request from the host (300 shown in FIG. 4), the memory device (100 shown in FIG. 4) may temporarily store write booster data WB_DATA corresponding to the write booster request in the SLC buffer 110_1. The write booster request may instruct the memory device (100 shown in FIG. 4) to temporarily store all data received from the host (300 shown in FIG. 4) in the SLC buffer 110_1 before the corresponding data are programmed in the storage area 110_2 by using the TLC method, and then output a response representing that the write booster operation of storing the data in the SLC buffer 110_1 has been completed. The write booster data WB_DATA may be stored in the SLC buffer 110_1 by using the SLC method, and then be programmed, using the TLC method, in the storage area 110_2 by a flush request for the host (300 shown in FIG. 4).

For example, the memory controller (200 shown in FIG. 4) may receive write booster data WB_DATA together with a write booster request from the host (300 shown in FIG. 4). The memory controller (200 shown in FIG. 4) may output, to the memory device (100 shown in FIG. 4), the write booster data WB_DATA together with a write booster command corresponding to the write booster request. Subsequently, the memory device (100 shown in FIG. 4) may perform a write booster operation corresponding to the write booster command.

In the write booster operation, the write booster data WB_DATA may be temporarily stored in the SLC buffer 110_1 by using the SLC method. When a size of the data stored in the SLC buffer 110_1 is a first reference value or more, a write booster count WB_COUNT representing the size of the write booster data WB_DATA stored in response to the write booster request among the data stored in the SLC buffer 110_1 may be output to the memory controller (300 shown in FIG. 4).

For example, when the data stored in the SLC buffer 110_1 occupies 80% or more of the SLC buffer 110_1 (i.e., when an available capacity of the SLC buffer 110_1 becomes 20% or less), a write booster count WB_COUNT may be output from the SLC buffer 110_1. That is, the first reference value may represent that the size of the SLC 110_1 is at least 80% of the capacity of the SLC buffer 110_1.

Subsequently, when a flush request is received from the host (300 shown in FIG. 4), data stored in response to the write booster request among the data stored in the SLC buffer 110_1 may be programmed as flush data FLUSH_DATA in the storage area 110_2. The flush data FLUSH_DATA may be programmed in the storage area 110_2 by using the TLC method.

When the data stored in the SLC buffer 110_1 in response to the write booster request are all programmed as the flush data FLUSH_DATA in the storage area 110_2, the write booster data WB_DATA stored in the SLC buffer 110_1 may be erased.

In an embodiment, after the write booster data WB_DATA are stored in the SLC buffer 110_1 in response to the write booster request, the write booster data WB_DATA may be erased, so that program-erase counts EW_COUNT of the respective memory blocks in the SLC buffer 110_1 may be increased.

However, when a program-erase count of a specific memory block of the SLC buffer 110_1 is increased, the reliability of data of the specific memory block may be decreased. That is, the life of the memory device (100 shown in FIG. 4) may be decreased as the program-erase count of the specific memory block is increased.

Therefore, a static wear leveling (SWL) operation is performed so as to prevent a phenomenon in which the program-erase count of a specific memory block among the memory blocks in the SLC buffer 110_1 is rapidly increased.

In the present disclosure, the write booster count WB_COUNT output from the SLC buffer 110_1 may be considered as a condition for performing the static wear leveling (SWL) operation.

A method for referring to the write booster count WB_COUNT will be described in more detail with reference to FIGS. 6 to 8.

Figure 6:
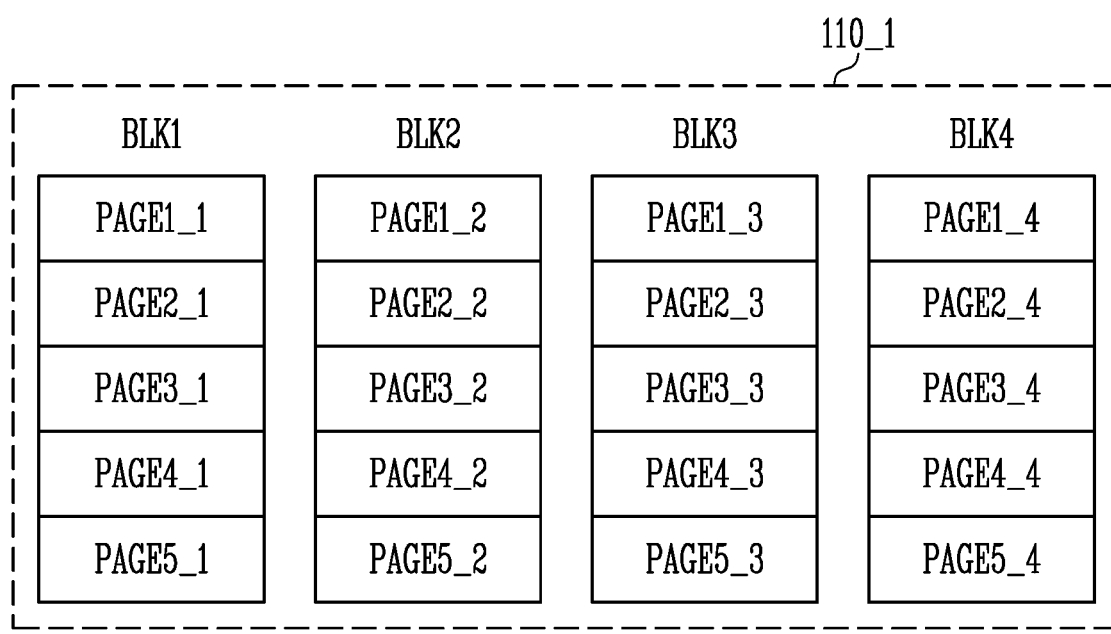
FIG. 6 is a diagram illustrating an SLC buffer.

FIG. 6 is a diagram illustrating the SLC buffer.

Referring to FIGS. 5 and 6, FIG. 6 illustrates memory blocks included in the SLC buffer 110_1 shown in FIG. 5. Referring to FIG. 6, a first memory block BLK1 may include (1_1)th to (5_1)th pages PAGE1_1 to PAGE5_1, a second memory block BLK2 may include (1_2)th to (5_2)th pages PAGE1_2 to PAGE5_2, a third memory block BLK3 may include (1_3)th to (5_3)th pages PAGE1_3 to PAGE5_3, and a fourth memory block BLK4 may include (1_4)th to (5_4)th pages PAGE1_4 to PAGE5_4.

In FIG. 6, it is illustrated that the SLC buffer 110_1 includes four (4) memory blocks, each containing five (5) pages. However, in the present invention is not limited to this specific configuration; the SLC buffer 110_1 may have any suitable number of memory blocks, and each may include any suitable number of pages.

In an embodiment, referring to FIG. 4, the write booster controller (210 shown in FIG. 4) may set memory blocks used as the SLC buffer 110_1 among a plurality of memory blocks in the memory device (100 shown in FIG. 4) according to a write booster request of the host (300 shown in FIG. 4). A size of the SLC buffer 110_1 may be determined according to buffer size information BUFFER_SIZE_INF received from the write booster controller 210.

Consequently, the first to fourth memory blocks BLK1 to BLK4 may be allocated to the SLC buffer 110_1, based on the buffer size information BUFFER_SIZE_INF.

Figure 7A:
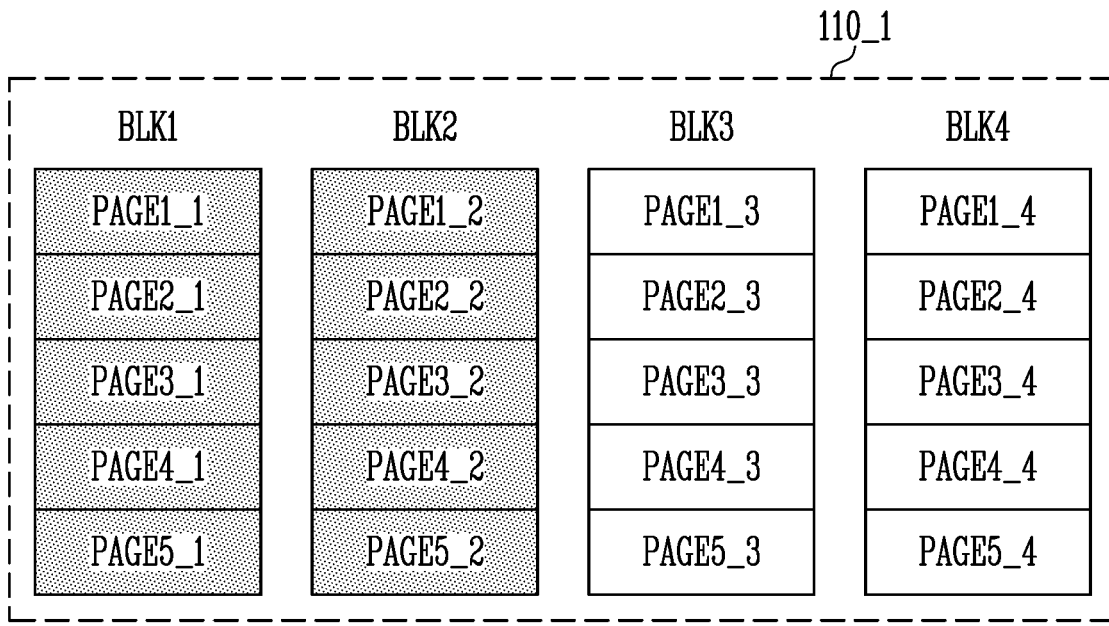
FIGS. 7A and 7B are diagrams illustrating an example in which data are stored in the SLC buffer and a write booster count output from the SLC buffer.
Figure 7B:
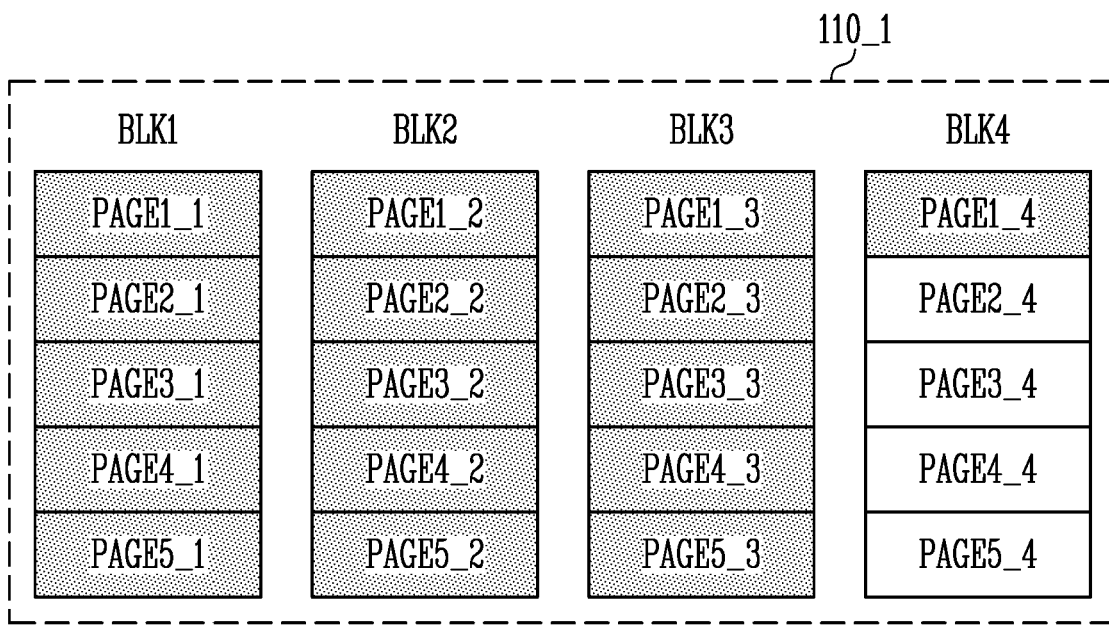

FIGS. 7A and 7B are diagrams illustrating an example in which data are stored in the SLC buffer and a write booster count output from the SLC buffer.

Referring to FIGS. 7A and 7B, FIG. 7A illustrates a case where the amount of data stored in the SLC buffer 110_1 is less than 80% of the buffer's capacity, and FIG. 7B illustrates a case where the amount of data stored in the SLC buffer 110_1 is more than 80% of the buffer's capacity.

In an embodiment, when the amount of data stored in the SLC buffer 110_1 is more than 80% of the buffer's capacity, the SLC buffer 110_1 may determine the amount of the write booster data stored based on a write booster request among the data stored in the SLC buffer 110_1. That is, a write booster count WB_COUNT obtained by counting (or determining the size of) the write booster data may be output to the write booster controller (210 shown in FIG. 4). Subsequently, the write booster controller (210 shown in FIG. 4) may store the write booster count WB_COUNT received from the SLC buffer 110_1.

Referring to FIG. 7A, when the size of the data stored in the SLC buffer 110_1 is less than 80% of the size of the SLC buffer 110_1, the SLC buffer 110_1 may not output the write booster count WB_COUNT. That is, when the size of the data stored in the SLC buffer 110_1 does not become a reference value or more, the SLC buffer 110_1 may not count (or otherwise determined the size of) the write booster data among the data stored in the SLC buffer 110_1. Therefore, the write booster count WB_COUNT may not be stored in the write booster controller (210 shown in FIG. 4).

However, referring to FIG. 7B, the size of the data stored in the SCL buffer 110_1 may become 80% or more of the size of the SLC buffer 110_1. The SLC buffer 110_1 may count (or determine the size of) write booster data stored based on a write booster request among the data stored in the SLC buffer 110_1, and output a value representing the size of the write booster data to the write booster controller (210 shown in FIG. 4).

For example, a number of the write booster data pieces among the data stored in the SLC buffer 110_1 may be '10,' and thus the write booster count WB_COUNT may be '10.' Therefore, '10', as the write booster count WB_COUNT, may be output from the SLC buffer 110_1. The write booster controller (210 shown in FIG. 4) may receive and store 'the write booster count WB_COUNT of '10'.

When the write booster controller (210 shown in FIG. 4) stores the write booster count WB_COUNT, the write booster controller (210 shown in FIG. 4) may perform a next operation for performing a static wear leveling operation.

Figure 8A:
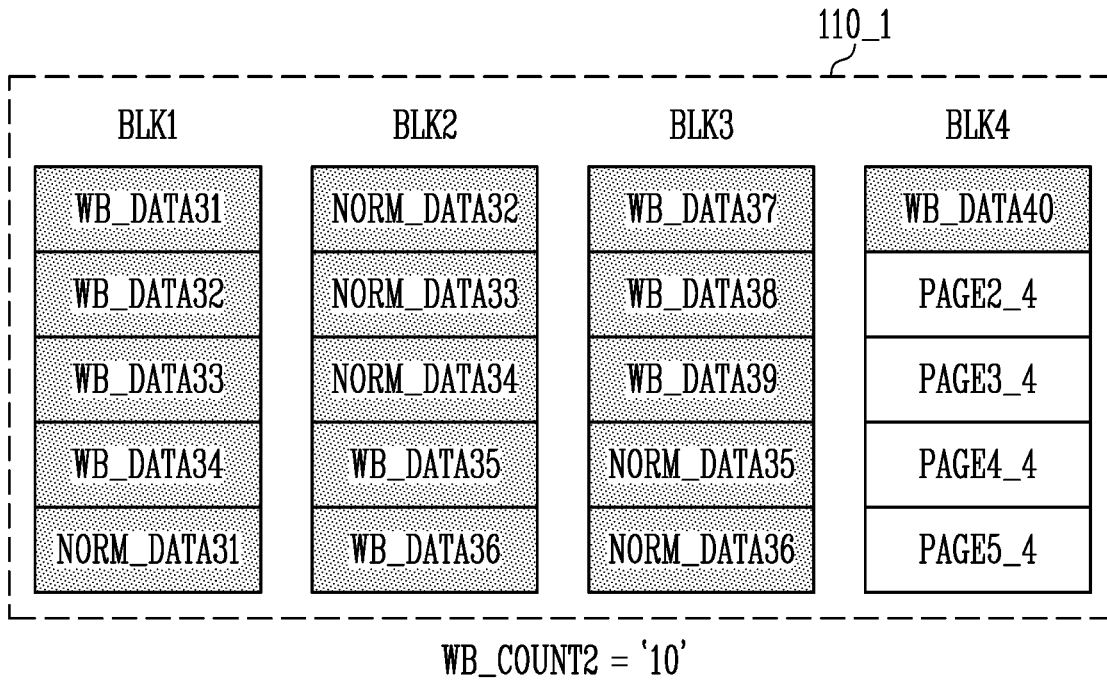
FIGS. 8A and 8B are diagrams illustrating an increase of the size of write booster data.
Figure 8B:
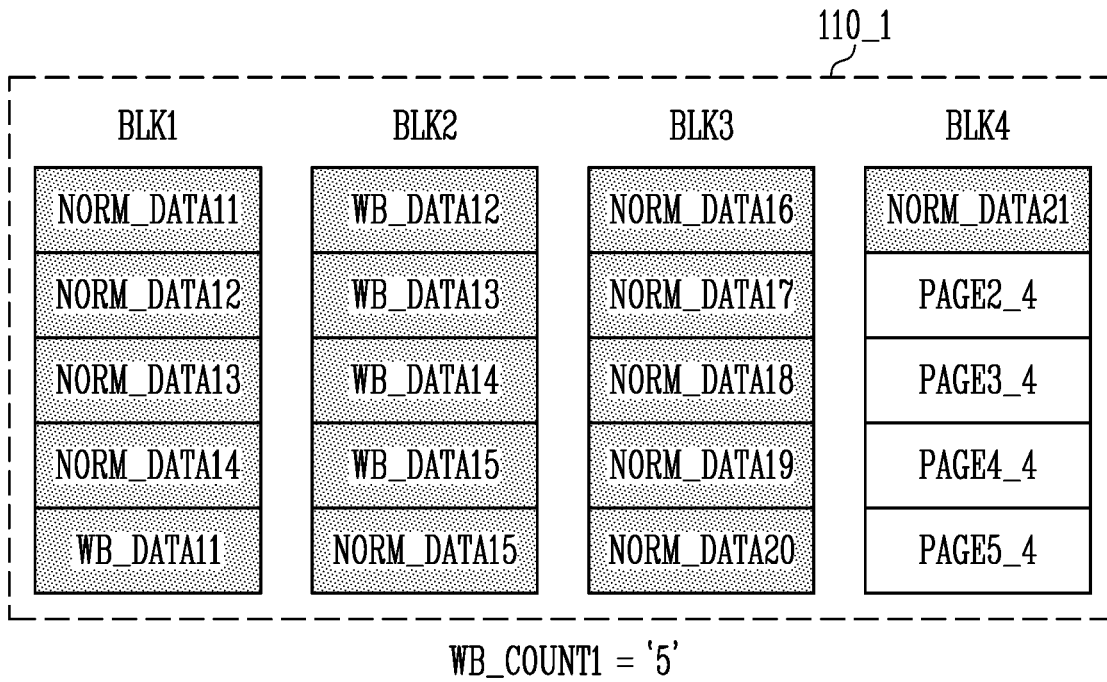

FIGS. 8A and 8B are diagrams illustrating an increase of the size of write booster data.

Referring to FIGS. 7A, 7B, 8A and 8B, FIG. 8A illustrates data stored in the SLC buffer 110_1 when the write booster count WB_COUNT of '10' is output in FIG. 7B, and FIG. 8B illustrates data store in the SLC buffer 110_1 when a write booster count WB_COUNT is output from the SLC buffer 110_1 before the write booster count WB_COUNT is output in FIG. 8A.

In FIG. 8A, a write booster count WB_COUNT output from the SLC buffer 110_1 is a second write booster count WB_COUNT2. In FIG. 8B, a write booster count WB_COUNT output from the SLC buffer 110_1 is a first write booster count WB_COUNT1.

In an embodiment, referring to FIG. 7B and FIG. 8A, when the data stored in the SLC buffer 110_1 become 80% or more of the size of the SLC buffer 110_1, the SLC buffer 110_1 may count write booster data stored by a write booster request among the data stored in the SLC buffer 110_1, and output a value representing the count of the write booster data to the memory controller (200 shown in FIG. 4).

Specifically, eleventh to fifteenth write booster data WB_DATA11 to WB_DATA15 and thirty-first to fortieth write booster data WB_DATA31 to WB_DATA40 among the data stored in the SLC buffer 110_1 may correspond to a write booster request received from the host (300 shown in FIG. 4). In addition, eleventh to twenty-first normal data NORM_DATA11 to NORM_DATA21 and thirty-first to thirty-sixth normal data NORM_DATA31 to NORM_DATA36 among the data stored in the SLC buffer 110_1 may correspond to a normal write request received from the host (300 shown in FIG. 4). The normal write request may be a request for programming data by using the SLC method.

In an embodiment, when the data stored in the SLC buffer 110_1 become 80% or more of the size of the SLC buffer 110_1, the SLC buffer 110_1 may count the number of pieces of write booster data (or otherwise determine its size) among the data stored in the SLC buffer 110_1.

In FIG. 8A, since the data corresponding to the write booster request are the thirty-first to fortieth write booster data WB_DATA31 to WB_DATA40, there are ten pieces of write booster data, yielding a second write booster count WB_COUNT2 of '10.' Therefore, '10' as the second write booster count WB_COUNT2 may be output from the SLC buffer 110_1, and the write booster controller (210 shown in FIG. 4) may receive and store the second write booster count WB_COUNT2.

In an embodiment, the write booster controller (210 shown in FIG. 4) may receive a first write booster count WB_COUNT1 before the write booster controller (210 shown in FIG. 4) receives the second write booster count WB_COUNT2. The first write booster count WB_COUNT1 may be output from the SLC buffer 110_1, when the data stored in the SLC buffer 110_1 are the same as FIG. 8B.

Specifically, referring to FIG. 8B, the eleventh to fifteenth write booster data WB_DATA11 to WB_DATA15 among the data stored in the SLC buffer 110_1 may correspond to a write booster request received from the host (300 shown in FIG. 4), and the eleventh to twenty-first normal data NORM_DATA11 to NORM_DATA21 may correspond to a normal write request received from the host (300 shown in FIG. 4). The normal write request may be a request for programming data by using the SLC method.

In an embodiment, when the data stored in the SLC buffer 110_1 become 80% or more of the size of the SLC buffer 110_1, the SLC buffer 110_1 may count the number of pieces of write booster data (or otherwise determine its size) among the data stored in the SLC buffer 110_1.

In FIG. 8B, since the data corresponding to the write booster request are the eleventh to fifteenth write booster data WB_DATA11 to WB_DATA15, there are five pieces of write booster data, yielding a first write booster count WB_COUNT1 of '5.' Therefore, '5' as the first write booster count WB_COUNT1 may be output from the SLC buffer 110_1, and the write booster controller (210 shown in FIG. 4) may receive and store the first write booster count WB_COUNT1.

In an embodiment, the write booster controller (210 shown in FIG. 4) may receive and store a second write booster count WB_COUNT2 after the write booster controller (210 shown in FIG. 4) receives and stores the first write booster count WB_COUNT1.

When the second write booster count WB_COUNT2 is stored, the write booster controller (210 shown in FIG. 4) may determine whether a difference between the second write booster count WB_COUNT2 and the previously stored first write booster count WB_COUNT1 is a second reference value or more.

That is, since the data stored in the SLC buffer 110_1 become 80% or more of the size of the SLC buffer 110_1, the write booster controller (210 shown in FIG. 4) may determine a difference between a currently stored write booster count and a previously stored write booster count. In other words, when the data stored in the SLC buffer 110_1 become 80% or more of the size of the SLC buffer 110_1, the write booster controller (210 shown in FIG. 4) may perform an operation for performing static wear leveling.

In an embodiment, when the difference between the second write booster count WB_COUNT2 and the first write booster count WB_COUNT1 is the second reference value or more, the write booster controller (210 shown in FIG. 4) may additionally determine the program-erase count for each memory block in the SLC buffer 110_1 and the number of free blocks included in the memory device (100 shown in FIG. 4).

In FIGS. 8A and 8B, it is assumed that the second reference value is '5'.

Therefore, since the difference between the second write booster count WB_COUNT2 and the first write booster count WB_COUNT1 is '5,' the write booster controller (210 shown in FIG. 4) may determine the program-erase count for each memory block in the SLC buffer 110_1 and the number of free blocks in the memory device (100 shown in FIG. 4).

Specifically, the write booster controller (210 shown in FIG. 4) may determine whether a difference between a maximum program-erase count and an average program-erase count among the program-erase counts EW_COUNT of the respective memory blocks in the SLC buffer 110_1 is a third reference value or more.

Subsequently, when the difference between the maximum program-erase count and the average program-erase count is the third reference value or more, the write booster controller (210 shown in FIG. 4) may determine whether the number of free blocks in the memory device (100 shown in FIG. 4) is a fourth reference value or more.

Figure 9:
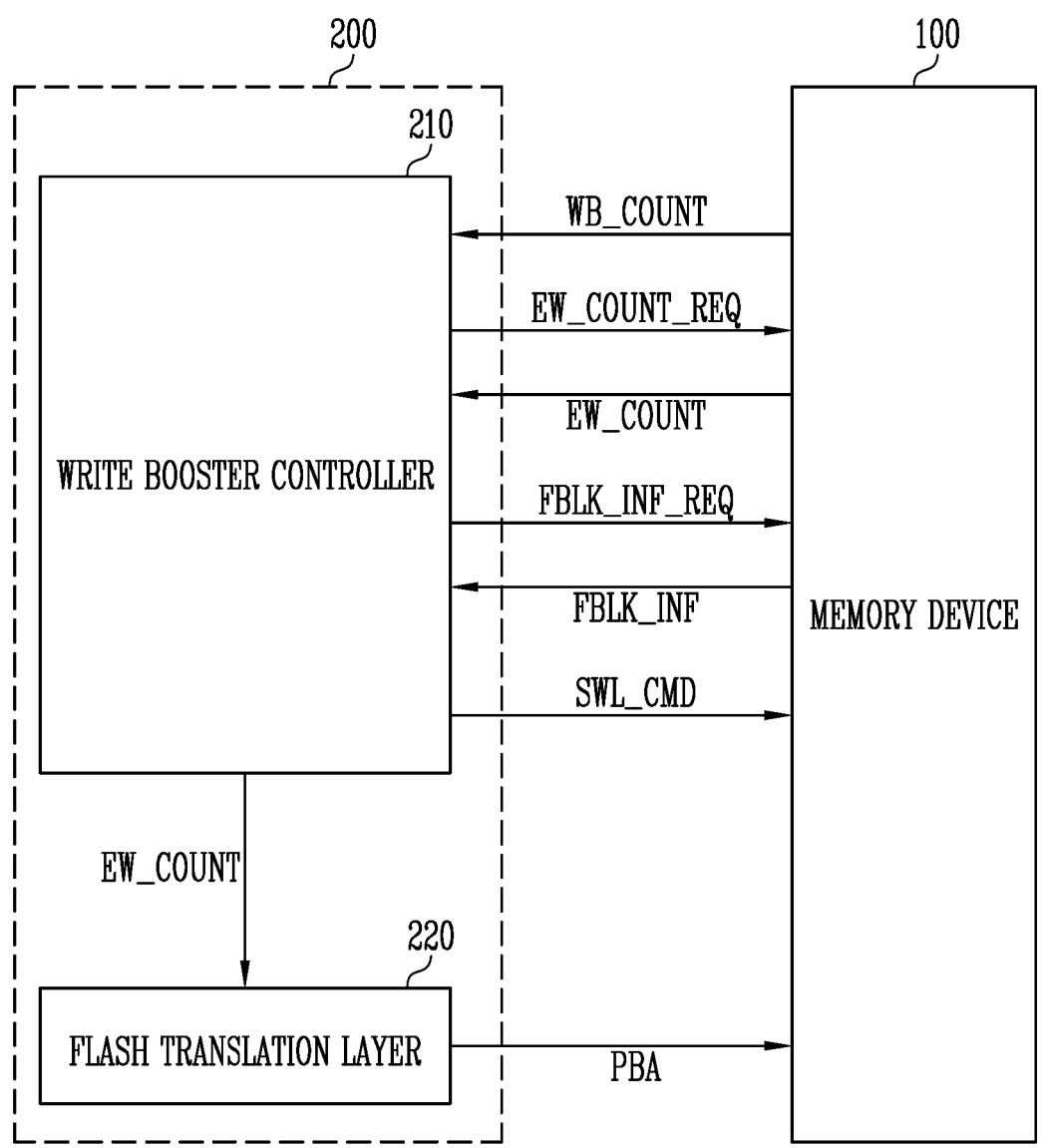
FIG. 9 is a diagram illustrating a process in which static wear leveling is performed.

FIG. 9 is a diagram illustrating a process in which static wear leveling is performed.

Referring to FIG. 9, FIG. 9 illustrates an operation of the memory controller 200 after a write booster count WB COUNT is received from the memory device 100.

In an embodiment, when the size of data stored in a SLC buffer included in the memory device 100 becomes a first reference value or more, a write booster count WB_COUNT may be output from the SLC buffer. The SLC buffer may be an area in which data are stored using the SLC method among areas of the memory device 100. In addition, the first reference value may correspond to 80% of the size of the SLC buffer.

When the write booster controller 210 receives the write booster count WB_COUNT from the memory device 100, the write booster controller 210 may store the received write booster count WB_COUNT. Subsequently, the write booster controller 210 may determine a difference between the above-described write booster count WB_COUNT and a write booster count WB_COUNT which was previously output and stored.

In an embodiment, the write booster controller 210 may determine whether the difference between the current and previous write booster counts WB_COUNT is a second reference value or more. For example, the write booster controller 210 may determine whether the difference between the write booster counts WB_COUNT is '5' or more.

When the difference between the write booster counts WB_COUNT is the second reference value or more, the write booster controller 210 may make an additional determination for performing a static wear leveling operation. For example, the write booster controller 210 may determine the program-erase count EW_COUNT for each memory block in the SLC buffer and the number of free blocks included in the memory device 100.

Specifically, when the difference between the current and previous write booster counts WB_COUNT is the second reference value or more, the write booster controller 210 may output, to the memory device 100, a program-erase count request EW_COUNT_REQ for requesting a program-erase count EW_COUNT of each of the memory blocks included in the SLC buffer. The program-erase count EW_COUNT of a memory block may be increased by '1' whenever an erase operation is performed on that memory block. The memory device 100 may output a program-erase count EW_COUNT for each memory block in the SLC buffer in response to the program-erase count request EW_COUNT_REQ.

Subsequently, the write booster controller 210 may determine a maximum value of the program-erase counts EW_COUNT and an average value of the program-erase counts EW_COUNT, based on the program-erase counts EW_COUNT received from the memory device 100.

When a difference between the maximum value of the program-erase counts EW_COUNT and the average value of the program-erase counts EW_COUNT, which are determined by the write booster controller 210, is a third reference value or more, the write booster controller 210 may output a free block information request FBLK_INF_REQ to the memory device 100. The free block information request FBLK_INF_REQ may instruct the memory device 100 to output a number of free blocks included in the memory device 100. The free block may mean a memory block to be allocated to the SLC buffer.

In an embodiment, the memory device 100 may output free block information FBLK_INF in response to the free block information request FBLK_INF_REQ received from the memory controller 200. The free block information FBLK_INF may include information on a number of free blocks in the memory device 100.

When the number of free blocks in the memory device 100 exceeds a fourth reference value, the write booster controller 210 may output, to the memory device 100, a static wear leveling command SWL_CMD for performing a static wear leveling operation, and output the program-erase count EW_COUNT received from the memory device 100 to the flash translation layer 220.

In an embodiment, the flash translation layer 220 may output a physical block address PBA to the memory device such that normal data are stored in a memory block having a maximum program-erase count EW_COUNT. The memory device 100 may perform an operation corresponding to the static wear leveling command SWL_CMD received from the write booster controller 210, based on the physical block address PBA received from the flash translation layer 220.

Specifically, the memory device 100 may move normal data to a memory block having a maximum program-erase count EW_COUNT among the memory blocks included in the SLC buffer, and move write boost data stored in the memory block having the maximum program-erase count EW_COUNT to a memory block having a relatively small program-erase count EW_COUNT.

Through the above-described process, the program-erase count EW_COUNT of the memory block having the maximum program-erase count EW_COUNT does not rapidly increase any more, and only the program-erase count EW_COUNT of the memory block having the relatively small program-erase count EW_COUNT may be increased. Thus, the program-erase counts EW_COUNT of the memory blocks are evenly increased, so that the life of the memory device 100 can be increased.

FIG. 10 is a diagram illustrating a process in which the static wear leveling is performed based on a program-erase count.

Referring to FIG. 10, FIG. 10 illustrates memory blocks allocated to the SLC buffer among the memory blocks included in the memory device (100 shown in FIG. 9) and a program-erase count EW_COUNT of each memory block. In FIG. 10, the memory blocks allocated to the SLC buffer may be first to fourth memory blocks BLK1 to BLK4. In another embodiment, more or less than four memory blocks may be allocated to the SLC buffer.

In FIG. 10, it is assumed that the third reference value is '500.'

In an embodiment, the program-erase count EW_COUNT of the first memory block BLK1 may be '1500,' the program-erase count EW_COUNT of the second memory block BLK2 may be '600,' the program-erase count EW_COUNT of the third memory block BLK3 may be '100,' and the program-erase count EW_COUNT of the fourth memory block BLK4 may be '1000.'

In an embodiment, the write booster controller (210 shown in FIG. 9) may receive and store write booster counts from the memory device (100 shown in FIG. 9), and then determine a difference between the currently and previously stored write booster counts. As a determination result, when the difference between the current and previous write boost counts is the second reference value or more, the write booster controller (210 shown in FIG. 9) may receive the program-erase counts EW_COUNT of the memory blocks in the SLC buffer from the memory device (100 shown in FIG. 9).

Referring to FIG. 9, according to the program-erase count request EW_COUNT_REQ output from the write booster controller (210 shown in FIG. 9), the write booster controller (210 shown in FIG. 9) may receive the program-erase counts EW_COUNT of the respective memory blocks in the SLC buffer from the memory device (100 shown in FIG. 9).

In an embodiment, the program-erase count of the first memory block BLK1 among the program-erase counts EW_COUNT of the first to fourth memory blocks BLK1 to BLK4 may be largest. In addition, an average value AVE of the program-erase counts EW_COUNT of the first to fourth memory blocks BLK1 to BLK4 may be '800.'

In an embodiment, the write booster controller (210 shown in FIG. 9) may determine whether a difference between a maximum value MAX of the program-erase counts EW_COUNT and the average value AVE of the program-erase counts EW_COUNT is the third reference value or more.

In FIG. 10, since it is assumed that the third reference value is '500,' the difference (MAX-AVE) between the maximum value MAX of the program-erase counts EW_COUNT and the average value AVE of the program-erase counts EW_COUNT is '700(=1500−800),' and thus is more than the third reference value.

Therefore, since the difference between the maximum value MAX of the program-erase counts EW_COUNT and the average value AVE of the program-erase counts EW_COUNT is the third reference value or more, the write booster controller (210 shown in FIG. 9) may determine a number of free blocks in the memory device (100 shown in FIG. 9) so as to perform a static wear leveling operation.

FIG. 11 is a diagram illustrating a process in which the static wear leveling is performed based on a number of free blocks.

Referring to FIG. 11, FIG. 11 is a diagram illustrating a plurality of memory blocks included in the memory device (100 shown in FIG. 1). In FIG. 11, it is assumed that the fourth reference value is '5.'

In FIG. 11, it is assumed that the memory device (100 shown in FIG. 1) includes first to forty-eighth memory blocks BLK1 to BLK48. Therefore, a total number of the memory blocks included in the memory device (100 shown in FIG. 1) may be 48. In another embodiment, the memory device (100 shown in FIG. 1) may include a larger number of memory blocks.

The first to fortieth memory blocks BLK1 to BLK40 among the plurality of memory blocks in the memory device 100 may be open blocks. The open blocks may be memory blocks allocated to store data. Some of the open blocks may be allocated to the SLC buffer in which data are stored using the SLC method, and some of the open blocks may be allocated to the storage area in which data are stored using TLC method.

When a plurality of pages in an open block are all stored with data, the open block may become a closed block. In addition, when a program fail occurs in a process of storing data, the open block may become a bad block. When the open block is processed as a bad block, the bad block may be a runtime bad block RTBB.

The forty-first to forty-eighth memory blocks BLK41 to BLK48 among the plurality of memory blocks included in the memory device (100 shown in FIG. 1) may be reserved blocks. The reserved blocks may be memory blocks added to the memory device (100 shown in FIG. 1) except memory blocks in which data are to be stored among the plurality of memory blocks. The number of reserved blocks may be preset at initialization of the memory device (100 shown in FIG. 1). That is, the forty-first to forty-eighth memory blocks BLK41 to BLK48 may be designated as reserved blocks at the initialization of the memory device (100 shown in FIG. 1). In another embodiment, the number of reserved blocks may be set after initialization and be changed depending on use of the memory device 100.

In an embodiment, some of the reserved blocks may be set as free blocks. The free blocks may be memory blocks to be allocated to the SLC buffer. Therefore, some of the memory blocks included in the memory device (100 shown in FIG. 1) may be allocated to the SLC buffer.

In FIG. 11, it is assumed that the forty-first to forty-fifth memory blocks BLK41 to BLK45 among the reserved blocks are set as free blocks.

Therefore, in FIG. 10, since the difference between the maximum value MAX of the program-erase counts EW_COUNT and the average value AVE of the program-erase counts EW_COUNT is the third reference value or more, the write booster controller (210 shown in FIG. 9) may determine a number of free blocks included in the memory device (100 shown in FIG. 1). Specifically, the write booster controller (210 shown in FIG. 9) may determine whether the number of free blocks is the fourth reference value or more.

In FIG. 11, since the forty-first to forty-fifth memory blocks BLK41 to BLK45 are allocated as free blocks, the number of free blocks may be '5,' which is the fourth reference value. Therefore, the write booster controller (210 shown in FIG. 9) may perform a static wear leveling operation.

Figure 12:
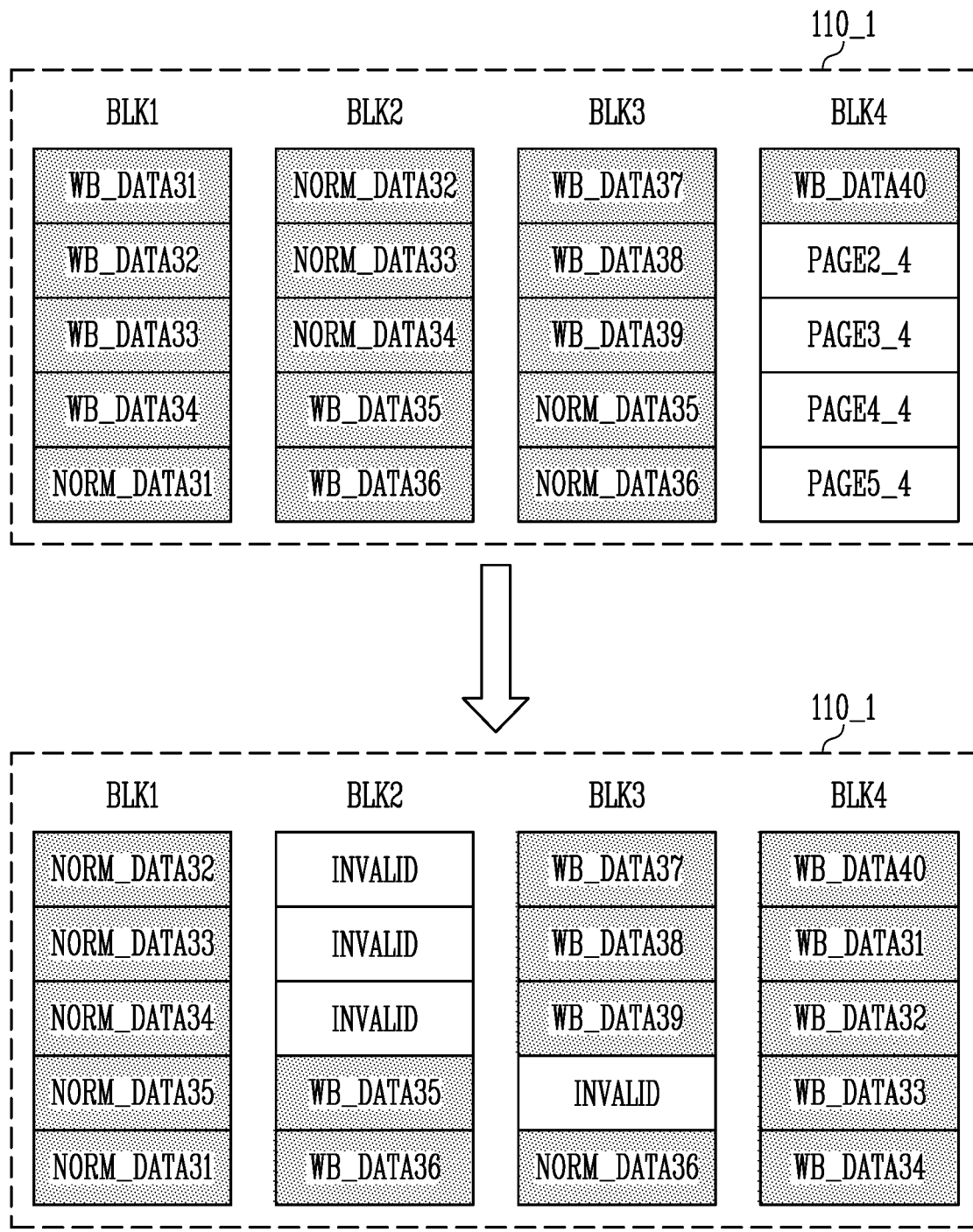
FIG. 12 is a diagram illustrating in which data are moved by the static wear leveling.

FIG. 12 is a diagram illustrating in which data are moved by the static wear leveling.

Referring to FIG. 8A and FIGS. 9 and 12, FIG. 12 illustrates a process in which the data in FIG. 8A are moved by a static wear leveling operation after it is determined that the write booster controller (210 shown in FIG. 9) is to perform the static wear leveling operation.

In FIG. 12, it is assumed that the program-erase count EW_COUNT of the first memory block BLK1 among the first to fourth memory blocks BLK1 to BLK4 in the SLC buffer is largest.

In an embodiment, since the program-erase count EW_COUNT of the first memory block BLK1 is largest, the write booster controller (210 shown in FIG. 9) may perform a static wear leveling operation such that only normal data are stored in the first memory block BLK1.

Specifically, the thirty-first to thirty-fourth write booster data WB_DATA31 to WB_DATA34 among the data stored in the first memory block BLK1 may be moved to another memory block.

For example, since no data is stored in the (2_4)th to (5_4)th pages PAGE2_4 to PAGE5_4 of the fourth memory block BLK4 among the memory blocks in the SLC buffer, the thirty-first to thirty-fourth write booster data WB_DATA31 to WB_DATA34 may be respectively stored in the (2_4)th to (5_4)th pages PAGE2_4 to PAGE5_4 of the fourth memory block BLK4.

Subsequently, the normal data may be moved to the first memory block BLK1.

For example, the thirty-second to thirty-fourth normal data NORM_DATA32 to NORM_DATA34 among the data stored in the second memory block BLK2 may be moved to the first memory block BLK1, and the thirty-fifth normal data NORM_DATA35 among the data stored in the third memory block BLK3 may be moved to the first memory block BLK1.

After only the normal data are stored in the first memory block BLK1, the thirty-second to thirty-fourth normal data NORM_DATA32 to NORM_DATA34 of the second memory block BLK2 and the thirty-fifth normal data NORM_DATA35 of the third memory block BLK3 may become invalid (INVALID).

In an embodiment, the thirty-fifth and thirty-sixth write booster data WB_DATA35 and WB_DATA36 in the second memory block BLK2 may be programmed in the storage area and then erased according to a flush request of the host (300 shown in FIG. 4). Alternatively, a portion of the second memory block BLK2 which becomes invalid (INVALID), i.e., the invalidated pages (INVALID) within that block, may be erased even before the thirty-fifth and thirty-sixth write booster data WB_DATA35 and WB_DATA36 are erased. Thus, the second memory block BLK2 is partially erased.

Further, the thirty-seventh to thirty-ninth write booster data WB_DATA37 to WB_DATA39 in the third memory block BLK3 may be programmed in the storage area and then erased according to a flush request of the host (300 shown in FIG. 4). Alternatively, a portion of the third memory block BLK3 which becomes invalid (INVALID), i.e., the invalidated page (INVALID) within that block may be erased even before the thirty-seventh to thirty-ninth write booster data WB_DATA37 to WB_DATA39 are erased. Thus, the third memory block BLK3 is partially erased.

Through the above-described process, when only the normal data are stored in the first memory block BLK1, the program-erase count EW_COUNT of the first memory block BLK1 may not be increased any more. Thus, the program-erase counts EW_COUNT of the memory blocks in the SLC buffer are evenly increased, so that the life of the memory device (100 shown in FIG. 4) can be increased.

Figure 13:
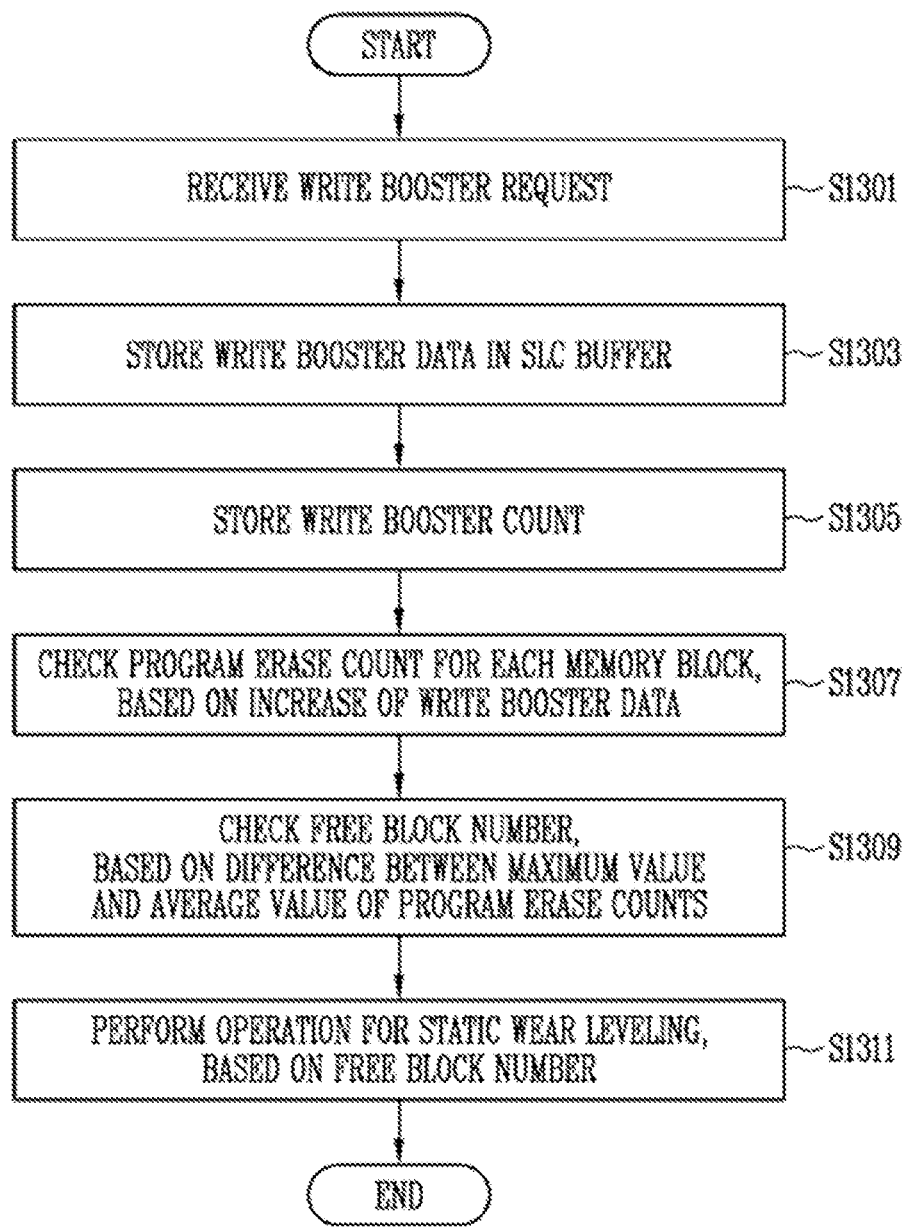
FIG. 13 is a flow chart illustrating an operation of the memory controller in accordance with an embodiment of the present disclosure.

FIG. 13 is a diagram illustrating an operation of the memory controller in accordance with an embodiment of the present disclosure.

Referring to FIG. 13, in operation S1301, the memory controller may receive a write booster request from the host. The write booster request may instruct the memory controller to output a response representing that, after data received from the host are stored in an SLC buffer of the memory device, a program operation has been completed even before the data stored in the SLC buffer are all programmed. The SLC buffer may be an area in which data are stored using the SLC method.

In operation S1303, the memory controller may store, in the SLC buffer, write booster data received together with the write booster request from the host. The data stored in the SLC buffer may be programmed in the storage area by using the TLC method.

In operation S1305, the memory controller may store a write booster count. The write booster count may be output from the memory device whenever the size of data stored in the SLC buffer are a first reference value or more. The first reference value may correspond to 80% of the size of the SLC buffer. The write booster count may represent the number of pieces the write booster data stored in response to the write booster request among the data stored in the SLC buffer. The write booster count is indicative of the size of the write booster data. For example, when each piece of write booster data is a unit size, the total size is the product of the write booster count and the unit size.

In operation S1307, the memory controller may check a program-erase count for each memory block, based on an increase of the write booster data, which may be determined based on the previous write booster count stored in the memory controller.

In an embodiment, when a difference between the current and previous write booster counts stored in the memory controller is a second reference value or more, the memory controller may check a program-erase count for each memory block.

In operation S1309, the memory controller may determine a number of free blocks, based on a difference between a maximum value and an average value of the program-erase counts EW_COUNT of the memory blocks in the SLC buffer.

For example, when the difference between the maximum value and the average value of the program-erase counts EW_COUNT is a third reference value or more, the memory controller may determine a number of free blocks among the memory blocks in the memory device. A free block may mean a memory block to be allocated to the SLC buffer among the memory blocks in the memory device.

In operation S1311, the memory controller may perform an operation for static wear leveling, based on the number of free blocks. For example, when the number of free blocks in the memory device is a fourth reference value or more, the memory controller may perform a wear leveling operation such that only normal data are stored in a memory block having a maximum program-erase count.

Specifically, within the SLC buffer, write booster data stored in the memory block having the maximum program-erase count may be moved to another memory block, and normal data among data stored in the another memory block may be moved to the memory block having the maximum program-erase count. The write booster data may be data corresponding to the write booster request of the host, and the normal data may be data corresponding to a normal write request of the host. A normal write request may instruct the memory device to store data by using the SLC method.

Figure 14:
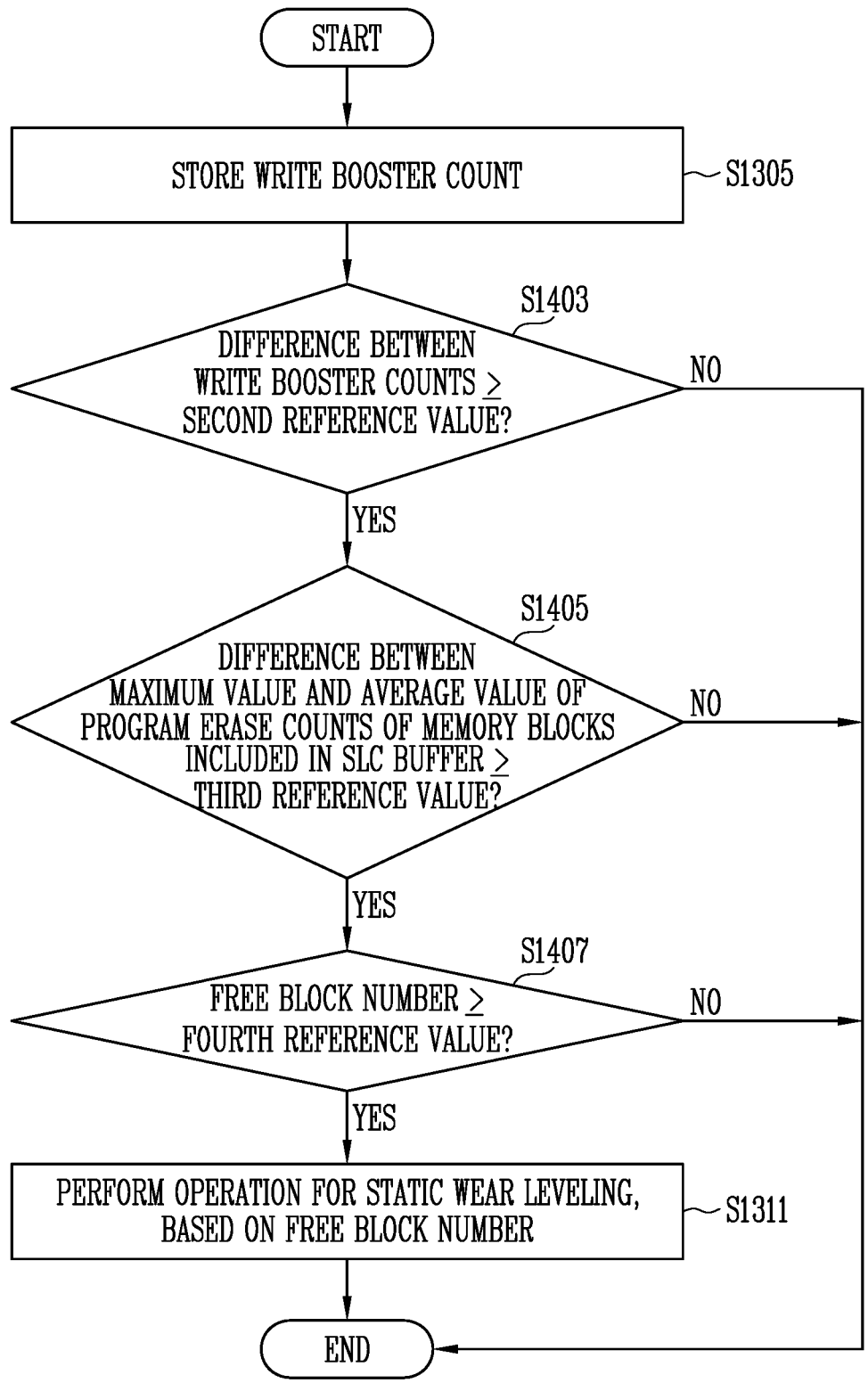
FIG. 14 is a flow chart illustrating an operation of the memory controller in accordance with an embodiment of the present disclosure.

FIG. 14 is a diagram illustrating an operation of the memory controller in accordance with an embodiment of the present disclosure.

Referring to FIGS. 13 and 14, in the operation S1305, the memory controller may store a write booster count. The write booster count may be output from the memory device whenever the size of the data stored in the SLC buffer is the first reference value or more. The first reference value may correspond to 80% of the size of the SLC buffer.

The write booster count may be obtained by counting the number of pieces of write booster data stored in response to the write booster request among the data stored in the SLC buffer.

In operation S1403, the memory controller may determine whether the difference between the currently and previously stored write booster counts is the second reference value or more. The difference between the current and previous write booster counts may mean an increase in the write booster data. That is, the difference between the write booster counts may increase as a larger amount of write booster data are stored in the SLC buffer. The difference between the current and previous write booster counts may decrease as a small amount of write booster data are stored in the SLC buffer.

When the difference between the current and previous write booster counts is the second reference value or more, the memory controller may proceed to operation S1405.

In the operation S1405, the memory controller may determine whether the difference between the maximum value and the average value of the program-erase counts EW_COUNT of the memory blocks in the SLC buffer is the third reference value or more. When the program-erase count of only a specific memory block is large, the memory controller may perform a wear leveling operation, based on the difference between the maximum value and the average value of the program-erase counts EW_COUNT such that the program-erase count can be evenly increased for each memory block in the SLC buffer.

When the difference between the maximum value and the average value of the program-erase counts EW_COUNT is the third reference value or more, the memory controller may proceed to operation S1407.

In the operation S1407, the memory controller may determine whether the number of free blocks in the memory device is the fourth reference value or more. A free bock may be a memory block to be allocated to the SLC buffer. That is, when a number of free blocks to be allocated to the SLC buffer is sufficient, the wear leveling operation is performed, and hence the memory controller may check a number of free blocks included in the memory device.

When the number of free blocks is the fourth reference value or more, the memory controller may proceed to the operation S1311.

In the operation S1311, the memory controller may perform an operation for static wear leveling, based on the number of free blocks. For example, the memory controller may perform the wear leveling operation such that only normal data are stored in a memory block having a maximum program-erase count.

Specifically, within the SLC buffer, write booster data stored in the memory block having the maximum program-erase count may be moved to another memory block, and normal data among data stored in the another memory block may be moved to the memory block having the maximum program-erase count.

Figure 15:
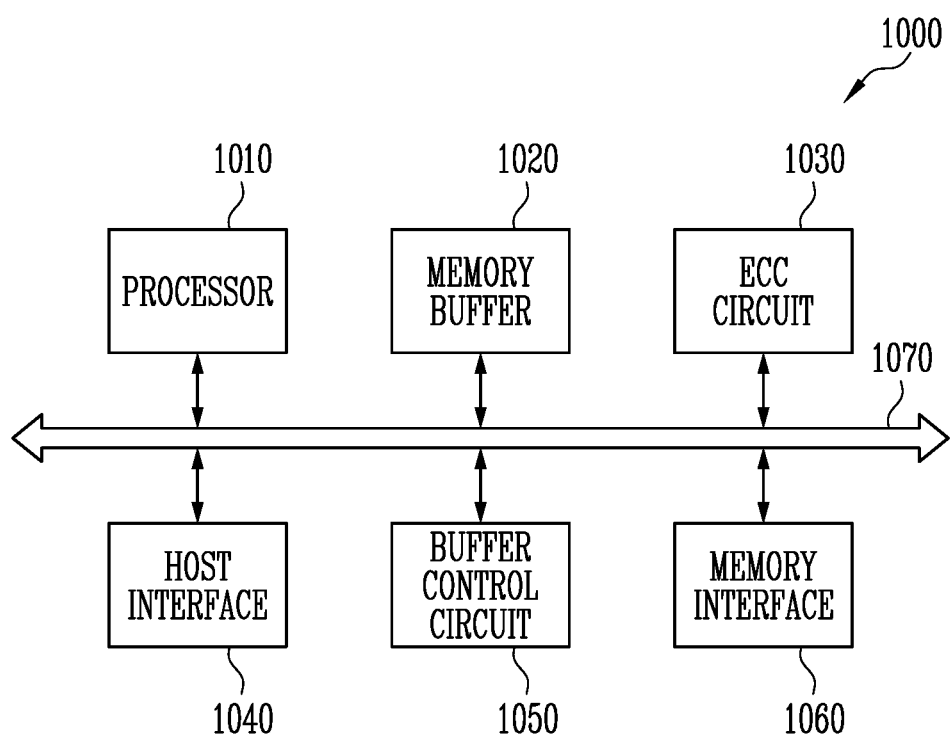
FIG. 15 is a diagram illustrating another embodiment of the memory controller shown in FIG. 1.

FIG. 15 is a diagram illustrating another embodiment of the memory controller shown in FIG. 1.

Referring to FIG. 15, a memory controller 1000 is coupled to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operation of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address LBA provided by the host through the FTL into a physical block address PBA. The FTL may receive a logic block address LPA, using a mapping table, to be translated into a physical block address PBA. Several address mapping methods of the FTL according to mapping units are available. Representative address mapping methods include a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

The processor 1010 may perform randomizing and derandomizing by driving software or firmware.

In an embodiment, when the memory device (100 shown in FIG. 4) performs a write booster operation, the processor 1010 may perform a wear leveling operation so as to prevent a program-erase count of a specific memory block among a plurality of memory blocks in an SLC buffer of the memory device (100 shown in FIG. 4) from being increased.

The write booster operation corresponds to a write booster request received from the host (300 shown in FIG. 4), and may include storing all program data in the SLC buffer of the memory device (100 shown in FIG. 4) and then outputting a program completion response, thereby increasing program speed. The SLC buffer may be an area in which data are stored using the SLC method among areas of the memory device (100 shown in FIG. 4), and the program-erase count may be increased by '1' whenever an erase operation is performed in a memory block.

In an embodiment, when data having a set size (i.e., a size corresponding to a first reference value) are stored in the SLC buffer, a write booster count representing a size of write booster data stored in the SLC buffer may be output from the SLC buffer. The output write booster count may be stored in the processor 1010 or the memory buffer 1020. The write booster data may be programmed in a storage area using the TLC method after the write booster data are stored, using the SLC method, in the SLC buffer in the write booster operation.

Subsequently, whenever the write booster count is stored in the processor 1010 or the memory buffer 1020, the processor 1010 may determine whether a difference between the output write booster count and a write booster count which was previously stored is a second reference value or more.

When the difference between the write booster counts is the second reference value or more, the processor 1010 may determine a difference between a maximum value and an average value of program-erase counts EW_COUNT received from the memory device (100 shown in FIG. 4). The program-erase count is a number of times an erase operation is performed on each of the plurality of memory blocks in the SLC buffer, and may be increased by '1' whenever the erase operation is performed on a memory block.

Subsequently, when the difference between the maximum value and the average value of the program-erase counts EW_COUNT is a third reference value or more, the processor 1010 may determine a number of free blocks in the memory device (100 shown in FIG. 4). Specifically, since a free block means a memory block to be allocated to the SLC buffer, i.e., since the wear leveling operation can be performed only when a sufficient number of free blocks are secured, the processor 1010 may determine a number of free blocks in the memory device (100 shown in FIG. 4).

When the number of free blocks is a fourth reference value or more, the processor 1010 may perform an operation for static wear leveling.

For example, the processor 1010 may move write booster data stored in a memory block having a maximum program-erase count to another memory block, and move normal data among data stored in the another memory block to the memory block having the maximum program-erase count. Normal data is different than write booster data, and may be data programmed using the SLC method.

Through the above-described process, since only the normal data are stored in the memory block having the maximum program-erase count, the program-erase count may not be increased any more. Thus, the program-erase count of each of the memory blocks in the SLC buffer is evenly increased, so that the life of the memory device (100 shown in FIG. 4) can be increased.

The memory buffer 1020 may be used as the working memory, the cache memory, or the buffer memory of the processor 1010. The memory buffer 1020 may store codes and commands, which are executed by the processor 1010. The memory buffer 1020 may store data processed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication protocols, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC) of an embedded MMC (eMMC), a Dual In-line Memory Module (DIMM), a Registered DIMM (RDIMM), and/or a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050. Instead, those components may be provided separately.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, so as not to interfere with, nor influence, each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 16:
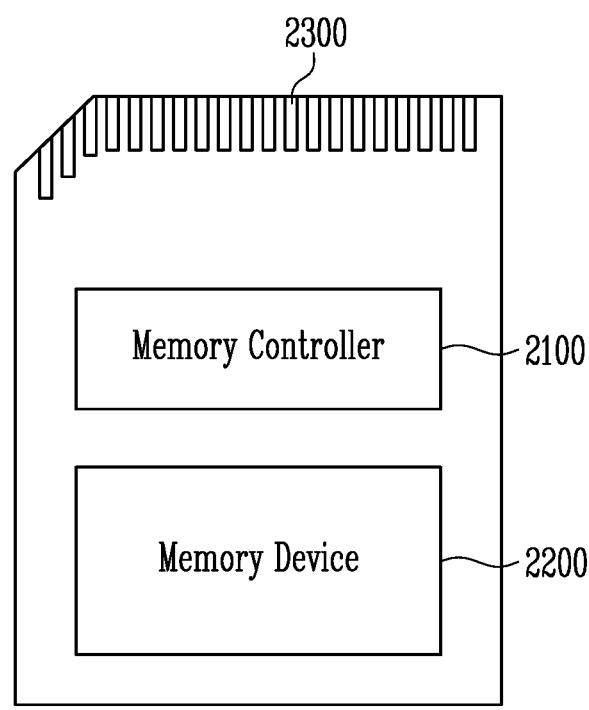
FIG. 16 is a block diagram illustrating a memory card system to which the storage device is applied in accordance with an embodiment of the present disclosure.

FIG. 16 is a block diagram illustrating a memory card system to which the storage device is applied in accordance with an embodiment of the present disclosure.

Referring to FIG. 16, the memory card system 2000 includes a memory controller 2100, a memory device 2200, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive firmware for controlling the memory device 2200. The memory device 2200 may be implemented the same as the memory device 100 (100 shown in FIG. 1).

In an example, the memory controller 2100 may include components such as a Random Access Memory (RAM), a processor, a host interface, a memory interface, and the error corrector 233.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), a Multi-Media Card (MMC) of an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and/or NVMe.

In an example, the memory device 2200 may be implemented with any of various nonvolatile memory devices such as an Electrically Erasable and Programmable ROM (EEPROM), a NAND flash memory, a NOR flash memory, a Phase-change RAM (PRAM), a Resistive RAM (Re- RAM), a Ferroelectric RAM (FRAM), and/or a Spin Torque Transfer magnetic RAM (STT-M RAM).

The memory controller 2100 and the memory device 2200 may be integrated into a single semiconductor device, to constitute a memory card, such as a PC card (Personal Computer Memory Card International Association (PCM-CIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and/or a Universal Flash Storage (UFS).

In an embodiment, when the memory device 2200 performs a write booster operation, the memory controller 2100 may perform a wear leveling operation so as to prevent a program-erase count of a specific memory block among a plurality of memory blocks in an SLC buffer of the memory device 2200 from being increased.

The write booster operation corresponds to a write booster request received from the host (300 shown in FIG. 4), and may include storing all program data in the SLC buffer of the memory device 2200 and then outputting a program completion response, thereby increasing program speed. The SLC buffer may be an area in which data are stored using the SLC method among areas of the memory device 2200, and the program-erase count may be increased by '1' whenever an erase operation is performed in a memory block.

In an embodiment, when data having a set size (i.e., a size corresponding to a first reference value) are stored in the SLC buffer, a write booster count representing a size of write booster data stored in the SLC buffer may be output from the SLC buffer. The output write booster count may be stored in the memory controller 2100. The write booster data may be programmed in a storage area by using the TLC method after the write booster data are stored, using the SLC method, in the SLC buffer by the write booster operation.

Subsequently, whenever the write booster count is stored in the memory controller 2100, the memory controller 2100 may determine whether a difference between the output write booster count and a write booster count which was previously stored is a set second reference value or more.

When the difference between the write booster counts is the second reference value or more, the memory controller 2100 may determine a difference between a maximum value and an average value of program-erase counts EW_COUNT received from the memory device 2200. The program-erase count is a number of times an erase operation is performed on each of the plurality of memory blocks included in the SLC buffer, and may be increased by '1' whenever the erase operation is performed on a memory block.

Subsequently, when the difference between the maximum value and the average value of the program-erase counts EW_COUNT is a third reference value or more, the memory controller 2100 may determine a number of free blocks included in the memory device 2200. Specifically, since a free block means a memory block to be allocated to the SLC buffer, i.e., since the wear leveling operation can be performed only when a sufficient number of free blocks are secured, the memory controller 2100 may determine a number of free blocks included in the memory device 2200.

When the number of free blocks is a fourth reference value or more, the memory controller 2100 may perform an operation for static wear leveling.

For example, the memory controller 2100 may move write booster data stored in a memory block having a maximum program-erase count to another memory block, and move normal data among data stored in the another memory block to the memory block having the maximum program-erase count. Normal data is different than write booster data, and may be programmed using the SLC method.

Through the above-described process, since only the normal data are stored in the memory block having the maximum program-erase count, the program-erase count may not be increased any more. Thus, the program-erase count of each of the memory blocks in the SLC buffer is evenly increased, so that the life of the memory device 2200 can be increased.

Figure 17:
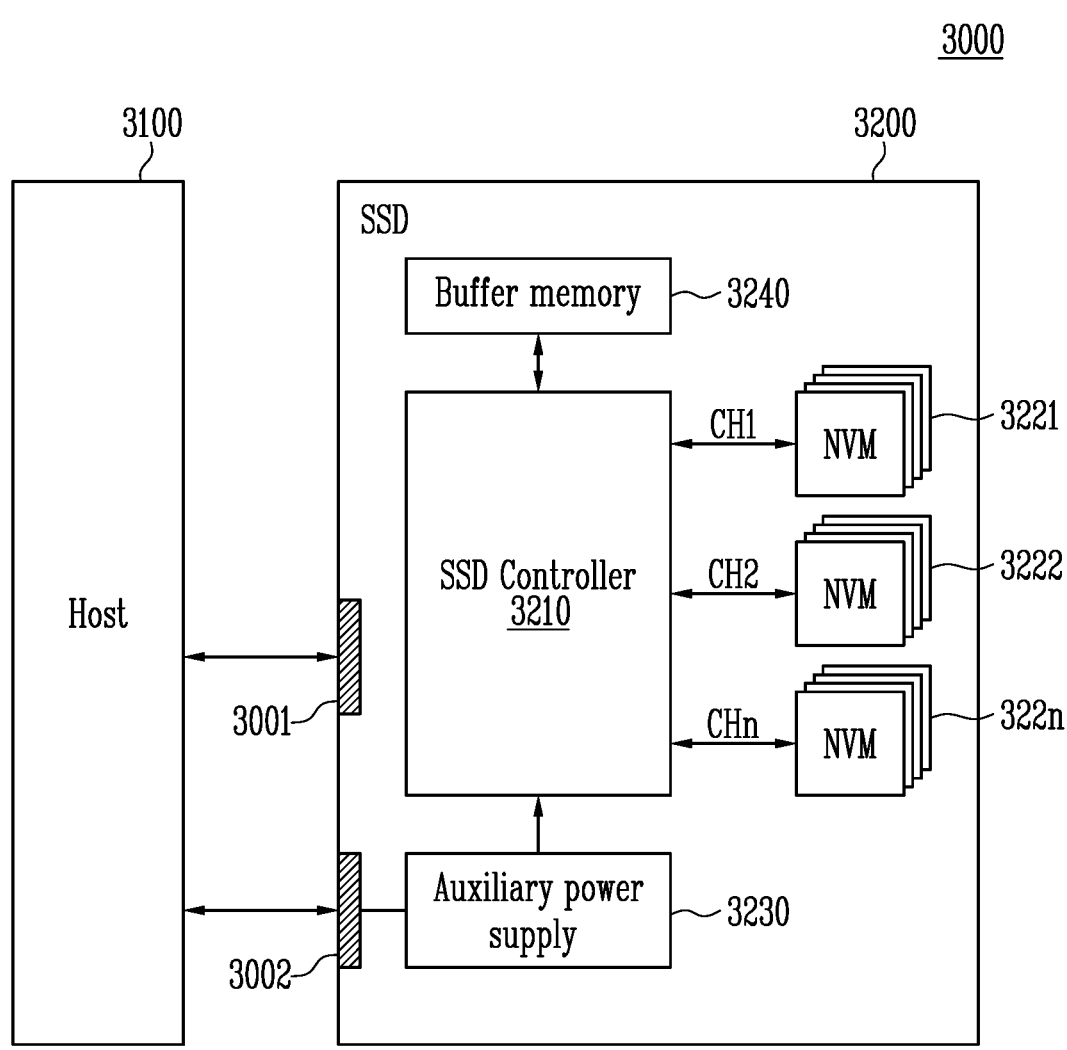
FIG. 17 is a block diagram illustrating a Solid State Drive (SSD) system to which the storage device is applied in accordance with an embodiment of the present disclosure.

FIG. 17 is a block diagram illustrating a Solid State Drive (SSD) system to which the storage device is applied in accordance with an embodiment of the present disclosure.

Referring to FIG. 17, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322*n*, an auxiliary power supply 3230, and a buffer memory 3240.

In an embodiment, the SSD controller 3210 may serve as the memory controller (200 shown in FIG. 1).

The SSD controller 3210 may control the plurality of flash memories 3221 to 322*n* in response to a signal SIG received from the host 3100. In an example, the signal SIG may be based on an interface between the host 3100 and the SSD 3200. For example, the signal SIG may be defined by at least one of interfaces such as a Universal Serial Bus (USB), a Multi-Media Card (MMC) of an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and/or an NVMe.

In an embodiment, when each of the plurality of flash memories 3221 to 322*n* performs a write booster operation, the SSD controller 3210 may perform a wear leveling operation so as to prevent a program-erase count of a specific memory block among a plurality of memory blocks in an SLC buffer of each of the plurality of flash memories 3221 to 322*n* from being increased.

The write booster operation corresponds to a write booster request received from the host 3100, and may include storing all program data in the SLC buffer of each of the plurality of flash memories 3221 to 322*n* and then outputting a program completion response, thereby increasing program speed. The SLC buffer may be an area in which data are stored using the SLC method among areas of each of the plurality of flash memories 3221 to 322*n*, and the program-erase count may be increased by '1' whenever an erase operation is performed in a memory block.

In an embodiment, when data having a set size (i.e., a size corresponding to a first reference value) are stored in the SLC buffer, a write booster count representing a size of write booster data stored in the SLC buffer may be output from the SLC buffer. The output write booster count may be stored in the SSD controller 3210. The write booster data may be programmed in the storage area by using the TLC method after the write booster data are stored, using the SLC method, in the SLC buffer by the write booster operation.

Subsequently, whenever the write booster count is stored in the SSD controller 3210, the SSD controller 3210 may determine whether a difference between the output write booster count and a write booster count which was previously stored is a second reference value or more.

When the difference between the write booster counts is the second reference value or more, the SSD controller 3210 may determine a difference between a maximum value and an average value of program-erase counts EW_COUNT received from the plurality of flash memories 3221 to 322n. The program-erase count is a number of times an erase operation is performed on each of the plurality of memory blocks included in the SLC buffer, and may be increased by '1' whenever the erase operation is performed on a memory block.

Subsequently, when the difference between the maximum value and the average value of the program-erase counts EW_COUNT is a third reference value or more, the SSD controller 3210 may determine a number of free blocks included in the plurality of flash memories 3221 to 322n. Specifically, since the free block means a memory block to be allocated to the SLC buffer, i.e., since the wear leveling operation can be performed only when a sufficient number of free blocks are secured, the SSD controller 3210 may determine a number of free blocks included in the plurality of flash memories 3221 to 322n.

When the number of free blocks is a fourth reference value or more, the SSD controller 3210 may perform an operation for static wear leveling.

For example, the SSD controller 3210 may move write booster data stored in a memory block having a maximum program-erase count to another memory block, and move normal data among data stored in the another memory block to the memory block having the maximum program-erase count. Normal data is different than write booster data, and may be programmed using the SLC method.

Through the above-described process, since only the normal data are stored in the memory block having the maximum program-erase count, the program-erase count may not be increased any more. Thus, the program-erase count of each of the memory blocks included in the SLC buffer is evenly increased, so that the life of the plurality of flash memories 3221 to 322n can be increased.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be disposed in or externally to the SSD 3200. For example, the auxiliary power supply 3230 may be disposed on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include any of various volatile memories such as a DRAM, an SDRAM, a DDR SDRAM, an LPDDR SDRAM, and a GRAM or nonvolatile memories such as a FRAM, a ReRAM, an STT-MRAM, and/or a PRAM.

FIG. 18 is a block diagram illustrating a user system to which the storage device is applied in accordance with an embodiment of the present disclosure.

Referring to FIG. 18, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include any of various volatile random access memories such as a DRAM, an SDRAM, a DDR SDRAM, a DDR2 SDRM, a DDR3 SDRAM, an LPDDR SDRAM, an LPDDR2 SDRAM, and/or an LPDDR3 SDRAM or any of various nonvolatile random access memories such as a PRAM, a ReRAM, an MRAM, and/or a FRAM. In an example, the application processor 4100 and the memory module 4200 may be provided as one semiconductor package based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, each of which may operate the same as the memory device described with reference to FIGS. 2 and 3. The storage module 4400 may operate the same as the storage device 50 described with reference to FIG. 1.

In an embodiment, when the storage module 4400 performs a write booster operation, the application processor 4100 may perform a wear leveling operation so as to prevent a program-erase count of a specific memory block among a plurality of memory blocks in an SLC buffer of the storage module 4400 from being increased.

The write booster operation corresponds to a write booster request received from the host (300 shown in FIG. 4), and may include storing all program data in the SLC buffer of the storage module 4400 and then outputting a program completion response, thereby increasing program speed. The SLC buffer may be an area in which data are stored using the SLC method among areas of storage module 4400, and the program-erase count may be increased by '1' whenever an erase operation is performed in a memory block.

In an embodiment, when data having a set size (i.e., a size corresponding to a first reference value) are stored in the SLC buffer, a write booster count representing a size of write booster data stored in the SLC buffer may be output from the SLC buffer. The output write booster count may be stored in the application processor 4100. The write booster data may be programmed in the storage area by using the TLC method after the write booster data are stored, using the SLC method, in the SLC buffer by the write booster operation.

Subsequently, whenever the write booster count is stored in the application processor 4100, the application processor 4100 may determine whether a difference between the output write booster count and a write booster count which was previously stored is a second reference value or more.

When the difference between the write booster counts is the second reference value or more, the application processor 4100 may determine a difference between a maximum value and an average value of program-erase counts EW_COUNT received from the storage module 4400. The program-erase count is a number of times an erase operation is performed on each of the plurality of memory blocks included in the SLC buffer, and may be increased by '1' whenever the erase operation is performed on a memory block.

Subsequently, when the difference between the maximum value and the average value of the program-erase counts EW_COUNT is a third reference value or more, the application processor 4100 may determine a number of free blocks included in the storage module 4400. Specifically, since a free block means a memory block to be allocated to the SLC buffer, i.e., since the wear leveling operation can be performed only when a sufficient number of free blocks are secured, the application processor 4100 may determine a number of free blocks included in the storage module 4400.

When the number of free blocks is a fourth reference value or more, the application processor 4100 may perform an operation for static wear leveling.

For example, the application processor 4100 may move write booster data stored in a memory block having a maximum program-erase count to another memory block, and move normal data among data stored in the another memory block to the memory block having the maximum program-erase count. Normal data is different than write booster data, and may be programmed using the SLC method.

Through the above-described process, since only the normal data are stored in the memory block having the maximum program-erase count, the program-erase count may not be increased any more. Thus, the program-erase count of each of the memory blocks included in the SLC buffer is evenly increased, so that the life of the storage module 4400 can be increased.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, in a write booster operation, a wear leveling operation is performed based on a size of write booster data stored in a buffer, a program-erase count, and a number of free blocks, so that the life of the memory device can be extended.

While the present disclosure has been shown and described with reference to certain embodiments thereof, it will be understood by those skilled in the art that various changes in form and details may be made therein without departing from the spirit and scope of the present invention as defined by the appended claims and their equivalents. Therefore, the scope of the present invention is not limited to the above-described embodiments but is determined by the appended claims including their equivalents.

In the above-described embodiments, not all operations need necessarily be performed and in some instances parts of certain steps may be omitted. Moreover, steps need not necessarily be performed in the described order. The disclosed embodiments are provided as examples to facilitate an understanding of the present invention, not to limit it. That is, it should be apparent to those skilled in the art that various modifications can be made on the basis of the technological scope of the present disclosure.

Although specific terminologies are used herein, they are used only to explain the embodiments of the present disclosure. The present invention is not restricted by any such terminology nor any particular details, as many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory controller for controlling a memory device including a SLC buffer in which data are stored using a single level cell program method among areas of the memory device, the memory controller including a write booster controller configured to:
   receive one or more write booster requests from a host,
   control the memory device to store data corresponding to the write booster requests in the SLC buffer using the single level cell program method,
   perform a wear leveling operation of the SLC buffer if a difference in size between data currently stored in the SLC buffer and data previously stored in the SLC buffer exceeds a predetermined value.

2. The memory controller of claim 1, wherein the write booster controller outputs a program completion response corresponding to a write booster request among the one or more write booster requests to the host when data corresponding to the write booster request is stored in the SLC buffer.

3. The memory controller of claim 1, wherein the write booster controller stores sizes of data stored in the SLC buffer if the sizes of the data stored in the SLC buffer is equal to or greater than a first reference value.

4. The memory controller of claim 3, wherein the write booster controller performs the wear leveling operation if the difference in size between the data currently stored in the SLC buffer and the data previously stored in the SLC buffer is equal to or greater than a second reference value.

5. The memory controller of claim 1, wherein the write booster controller performs the wear leveling operation based on erase counts of the SLC buffer.

6. The memory controller of claim 5, wherein the write booster controller performs the wear leveling operation by copying data stored in a memory block having a highest erase count among the SLC buffer to another memory block.

7. The memory controller of claim 1, wherein the write booster controller performs the wear leveling operation if a difference between a maximum value and an average value of erase counts of the SLC buffer is equal to or greater than a third reference value.

8. The memory controller of claim 1, wherein the write booster controller performs the wear leveling operation based on a number of free blocks included in the memory device.

9. The memory controller of claim 1, wherein the write booster controller performs the wear leveling operation if a number of free blocks included in the memory device is equal to or greater than a fourth reference value.

10. A memory system comprising:
a memory device configured to include a SLC buffer which are programmed using a single level cell (SLC) method and normal memory blocks which are programmed using a non-SLC method; and
a memory controller configured to receive one or more write booster requests from a host, to store data corresponding to the write booster requests in the SLC buffer and to perform a wear leveling operation on the SLC buffer if a difference in size between data currently stored in the SLC buffer and data previously stored in the SLC buffer is equal to or greater than a predetermined size.

11. The memory system of claim 10, wherein the memory controller performs the wear leveling operation if a size of data stored in the SLC buffer is equal to a first reference value.

12. The memory system of claim 10, wherein the memory controller performs the wear leveling operation based on erase counts of the SLC buffer.

13. The memory system of claim 12, wherein the memory controller performs the wear leveling operation by copying data stored in a memory block having a highest erase count among the SLC buffer to another memory block.

14. The memory system of claim 10, wherein the memory controller performs the wear leveling operation if a difference between a maximum value and an average value of erase counts of the SLC buffer is equal to or greater than a third reference value.

15. The memory system of claim 10, wherein the memory controller performs the wear leveling operation based on a number of free blocks included in the memory device.

16. The memory system of claim 10, wherein the memory controller performs the wear leveling operation if a number of free blocks included in the memory device is equal to or greater than a fourth reference value.

* * * * *